(12) United States Patent
Cariveau et al.

(10) Patent No.: US 11,692,911 B2
(45) Date of Patent: *Jul. 4, 2023

(54) TESTED PRODUCTS OF PDM PERFORMANCE TESTING DEVICE

(71) Applicant: Abaco Drilling Technologies, LLC, Houston, TX (US)

(72) Inventors: Peter Thomas Cariveau, Houston, TX (US); Timothy Mark Miller, Klein, TX (US); Jing Lu, Houston, TX (US); Jonathan Jared McCalip, Spring, TX (US); Jorge A. Gonzalez, Houston, TX (US)

(73) Assignee: Abaco Drilling Technologies LLC, Houston, TX (US)

( * ) Notice: Subject to any disclaimer, the term of this patent is extended or adjusted under 35 U.S.C. 154(b) by 228 days.

This patent is subject to a terminal disclaimer.

(21) Appl. No.: 17/098,035

(22) Filed: Nov. 13, 2020

(65) Prior Publication Data

US 2021/0080355 A1    Mar. 18, 2021

Related U.S. Application Data

(63) Continuation of application No. 16/544,600, filed on Aug. 19, 2019, now Pat. No. 10,837,874, which is a continuation-in-part of application No. 15/948,847, filed on Apr. 9, 2018, now Pat. No. 10,385,694, which is a continuation-in-part of application No.
(Continued)

(51) Int. Cl.
*G01M 99/00* (2011.01)
*F01C 1/02* (2006.01)
*F01C 20/28* (2006.01)

(52) U.S. Cl.
CPC ......... *G01M 99/007* (2013.01); *F01C 1/0246* (2013.01); *F01C 20/28* (2013.01); *G01M 99/002* (2013.01)

(58) Field of Classification Search
CPC . G01M 99/007; G01M 99/002; F01C 1/0246; F01C 20/28
See application file for complete search history.

(56) References Cited

U.S. PATENT DOCUMENTS

| | | |
|---|---|---|
| 1,892,217 A | 12/1931 | Moineau |
| 4,482,305 A | 11/1984 | Natkai et al. |

(Continued)

*Primary Examiner* — Max H Noori
(74) *Attorney, Agent, or Firm* — Zeman-Mullen & Ford, LLP

(57) ABSTRACT

An adapted elastomer compound, in which the adaptation is based at least in part on load performance data of a rotor/stator test coupon as evaluated on a test apparatus. The test coupon's stator section includes the original elastomer compound before adaptation thereof. The test apparatus includes a motor, a brake, and at least one sensor disposed to evaluate load performance data of the test coupon. The load performance data is the product of the process comprising the steps of: (a) rotating either the rotor section or the stator section on the test apparatus, wherein such rotation section actuates corresponding rotation of the other of the rotor section and the stator section; (b) applying a braking torque to the actuated rotor section or stator section; and (c) responsive to step (b), evaluating load performance data of the test coupon.

46 Claims, 19 Drawing Sheets

Related U.S. Application Data

15/464,640, filed on Mar. 21, 2017, now Pat. No. 9,938,829.

(60) Provisional application No. 62/311,278, filed on Mar. 21, 2016.

(56) References Cited

U.S. PATENT DOCUMENTS

| | | | |
|---|---|---|---|
| 4,540,347 A | 9/1985 | Child | |
| 4,559,812 A * | 12/1985 | Kitchen | G01N 11/14 73/54.35 |
| 4,976,595 A | 12/1990 | Taniguchi | |
| 5,368,108 A | 11/1994 | Aldred et al. | |
| 5,779,452 A | 7/1998 | McCombie | |
| 6,157,893 A | 12/2000 | Berger et al. | |
| 6,581,455 B1 | 6/2003 | Berger et al. | |
| 7,389,830 B2 | 6/2008 | Turner et al. | |
| 7,514,887 B2 | 4/2009 | Mullin et al. | |
| 8,388,327 B2 | 3/2013 | Ree | |
| 9,091,626 B2 * | 7/2015 | McMaster | G01N 11/165 |
| 10,385,694 B2 | 8/2019 | Cariveau et al. | |
| 10,837,874 B2 | 11/2020 | Cariveau et al. | |
| 2001/0024618 A1 | 9/2001 | Winmill | |
| 2003/0012467 A1 * | 1/2003 | Merot | F16C 27/063 384/220 |
| 2006/0283673 A1 * | 12/2006 | Lamport | F16D 65/10 188/251 R |
| 2009/0220352 A1 | 9/2009 | Carstensen | |
| 2009/0289145 A1 | 11/2009 | Behar et al. | |
| 2011/0011053 A1 | 1/2011 | Benham | |
| 2011/0067800 A1 * | 3/2011 | Bottomley | B29C 48/40 156/128.6 |
| 2014/0097026 A1 | 4/2014 | Clark et al. | |
| 2015/0022051 A1 | 1/2015 | Meng et al. | |
| 2015/0167466 A1 | 6/2015 | Teodorescu et al. | |
| 2018/0299347 A1 | 10/2018 | Frohler | |
| 2021/0080355 A1 * | 3/2021 | Cariveau | F04C 14/28 |

* cited by examiner

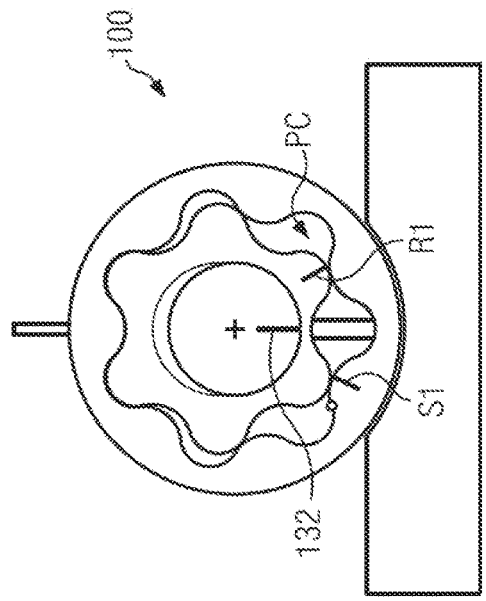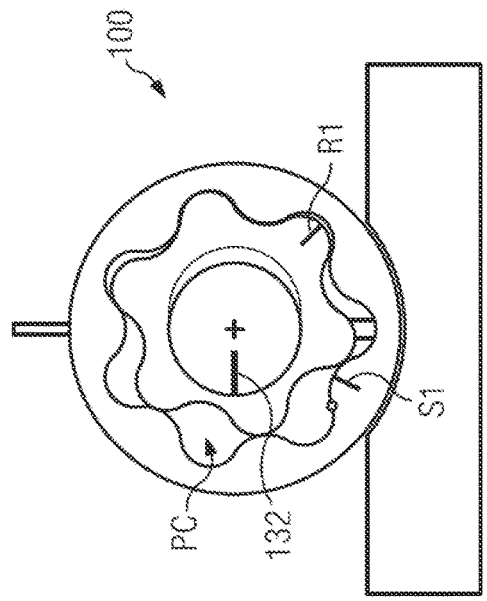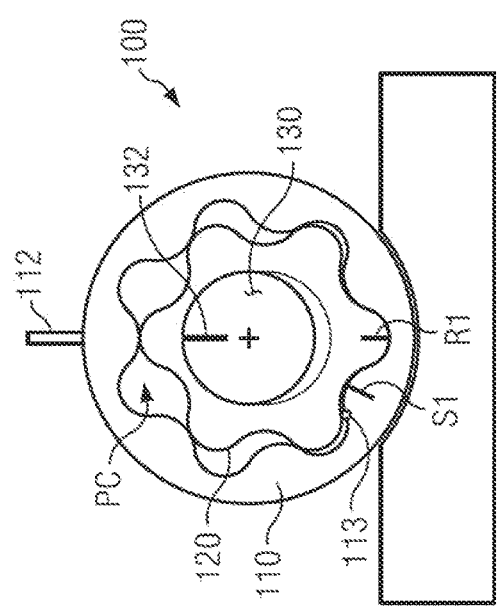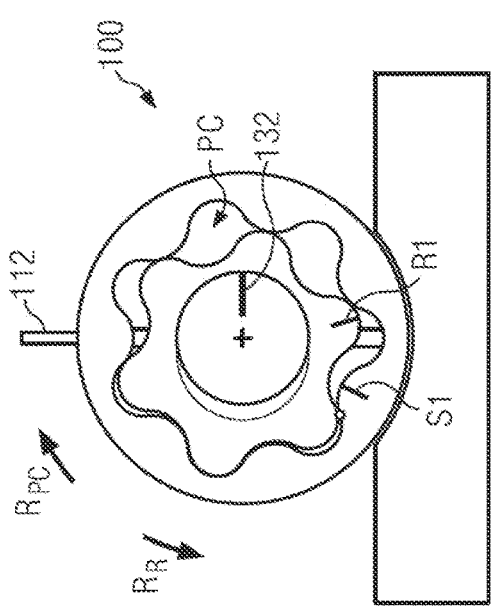
Fig. 1A (Prior Art)
Fig. 1B (Prior Art)
Fig. 1C (Prior Art)
Fig. 1D (Prior Art)

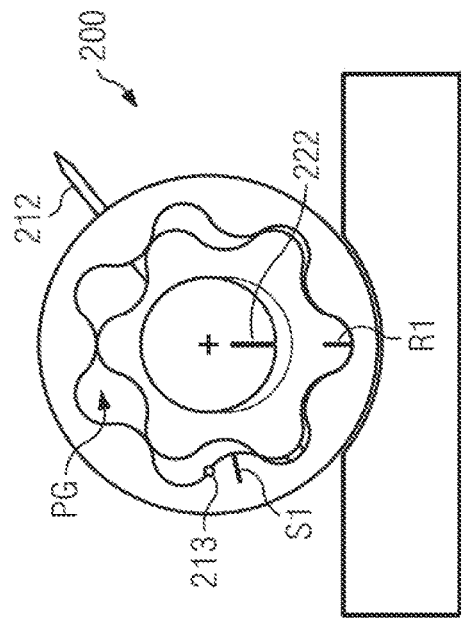
Fig. 2C
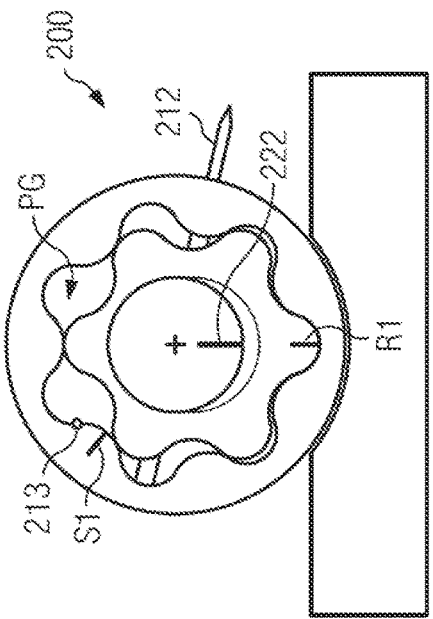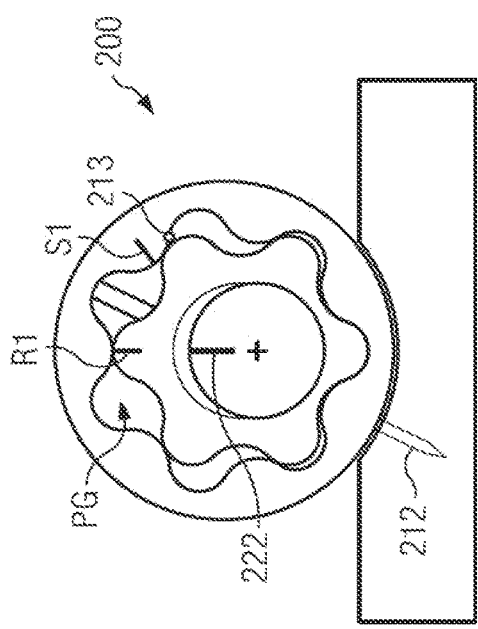
Fig. 2D
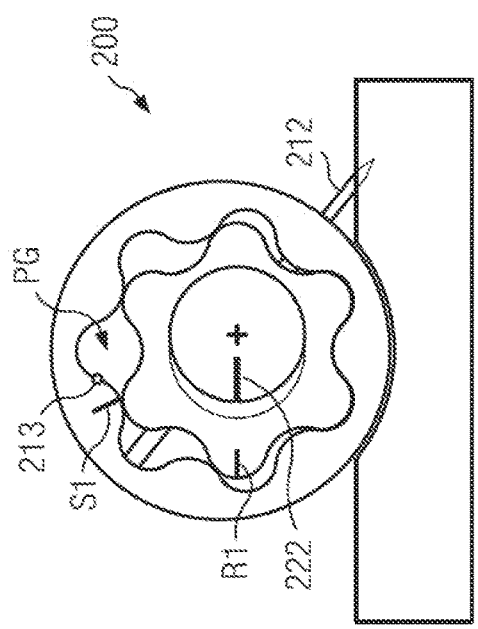
Fig. 2E
Fig. 2F

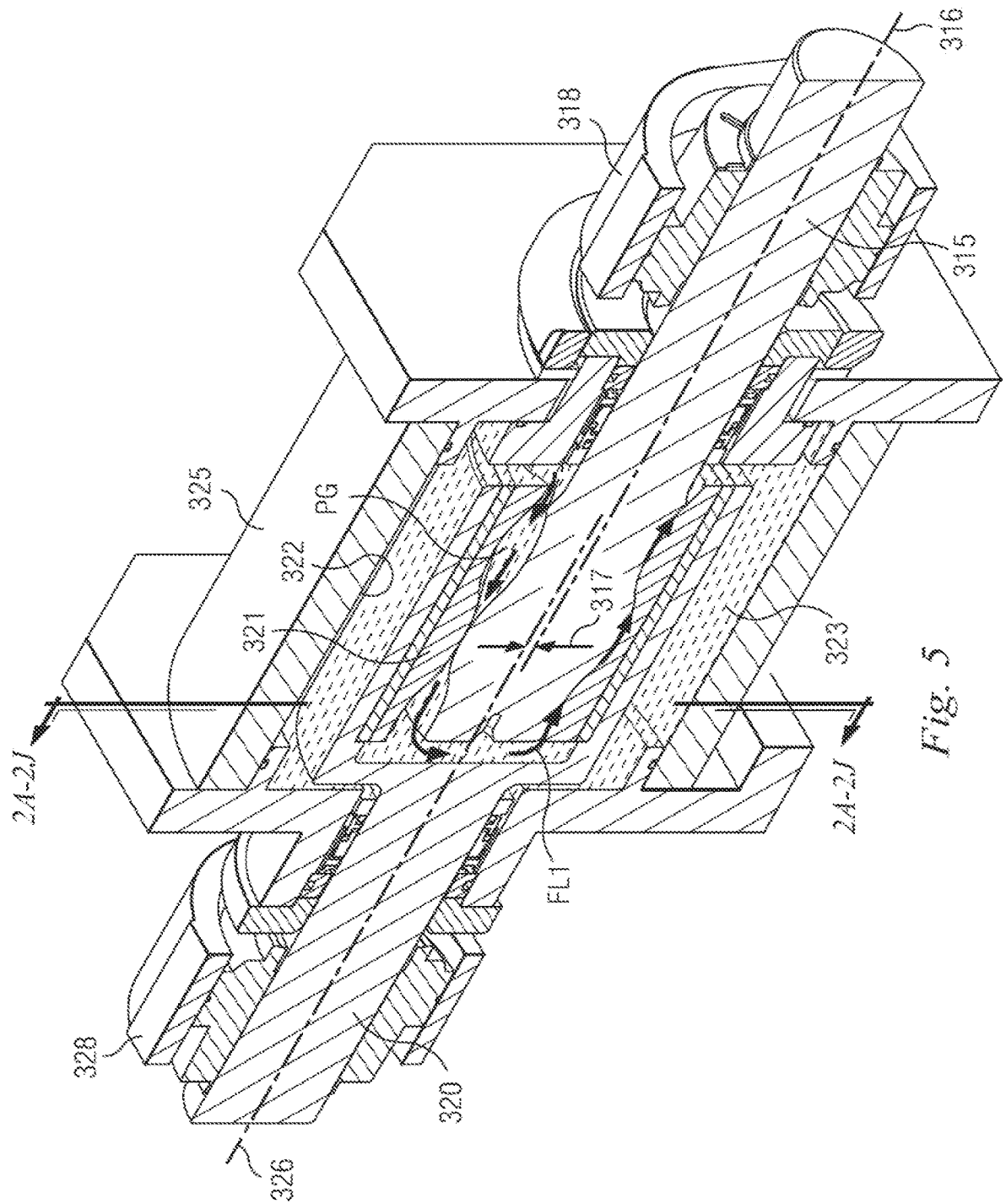

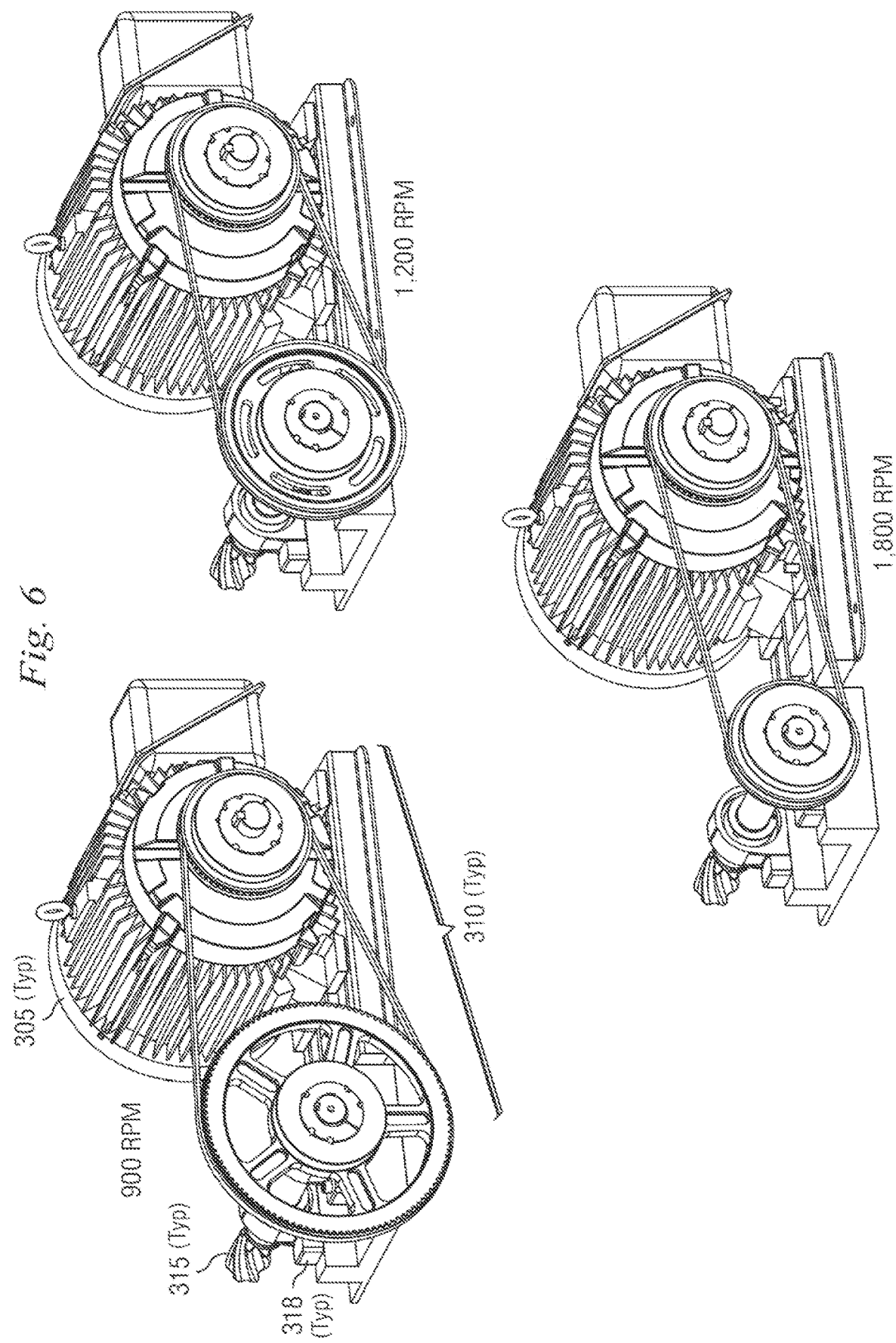

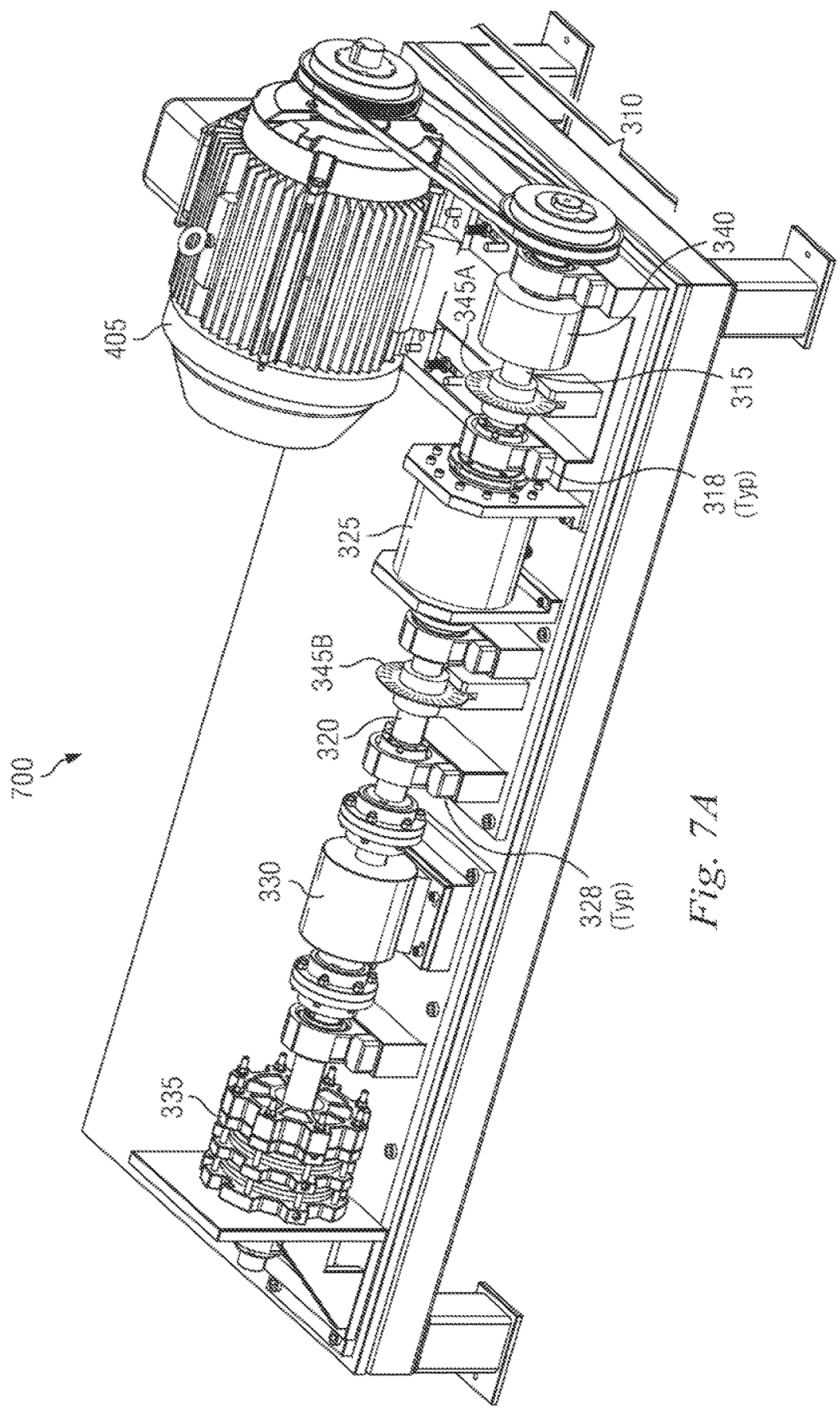

TESTED PRODUCTS OF PDM PERFORMANCE TESTING DEVICE

RELATED APPLICATIONS

This application is a continuation of, commonly-invented and commonly-assigned U.S. patent application Ser. No. 16/544,600 filed Aug. 19, 2019 (soon to be U.S. Pat. No. 10,837,874). Ser. No. 16/544,600 is a continuation-in-part of commonly-assigned U.S. patent application Ser. No. 15/948,847 filed Apr. 9, 2018 (now U.S. Pat. No. 10,385,694). Ser. No. 15/948,847 is a continuation-in-part of commonly-assigned U.S. patent application Ser. No. 15/464,640 filed Mar. 21, 2017 (now U.S. Pat. No. 9,938,829). Ser. No. 15/464,640 claims the benefit and priority to, commonly-assigned U.S. Provisional Patent Application Ser. No. 62/311,278 filed Mar. 21, 2016. The entire disclosures of Ser. Nos. 16/544,600, 15/948,847, 15/464,640 and 62/311,278 are incorporated herein by reference.

FIELD OF THE DISCLOSURE

This disclosure is directed generally to devices that test the performance of a subterranean positive displacement motor ("PDM"), and more particularly to a device that miniaturizes the performance testing of full-scale PDMs while still maintaining accurate simulation of downhole conditions during such miniaturized performance testing.

BACKGROUND OF THE DISCLOSED TECHNOLOGY

Currently, PDMs are tested using standardized ASTM protocols in order to simulate performance of parameters such as elastomer material performance and elastomer bonding performance under projected drilling loads. Conventional testing may be performed on failed PDM parts (typically stators) that have been retrieved from downhole service as part of an investigation into the cause of the failure. Alternatively, conventional testing may be performed as part of well planning activity, prior to drilling, in order to optimize selection of PDM components such as stator elastomer in view of the expected downhole environmental conditions and anticipated loading.

Conventional testing is done according to current applicable ASTM protocols. The ASTM tests are not particularly representative of specific expected or encountered downhole environments. First, the ASTM tests are not able to replicate the cyclic loading stresses encountered by PDMs in service. Second, the ASTM tests only peripherally simulate the elevated temperatures and pressures encountered by PDMs in service.

Generally, the ASTM tests are basic immersion tests in which an elastomer sample from a stator is first exposed to drilling fluid for a prescribed period at elevated temperatures, followed by performance evaluation by pull or tear testing. The performance evaluation is normally done at ambient temperatures and pressures. The purpose of the ASTM testing is to evaluate loss of physical properties in the rubber material and/or bond integrity. The ASTM testing may be done with a small volume of drilling fluid used in the specific drilling application. The drilling fluid sample may be taken from the actual drilling site.

Examples of specific conventional ASTM protocols include the following:
- ASTM D2240—Durometer Hardness (Shore A)
- ASTM D412—Tensile properties (Die C)
- ASTM D5289—Vulcanization using Rotorless Cure Meter (MDR tests)
- ASTM D624—Tear Strength (Die C)
- ASTM D3182—Practice for preparing standard vulcanized sheets (for tensile and tear bars)
- ASTM D429—Adhesion
- ASTM D6370—Compositional Analysis by Thermogravimetry (TGA)
- ASTM D471—Rubber Property Effect of Liquids (Swell or immersion test)

In addition to the traditional ASTM testing, two other conventional test methods are known to evaluate the performance of PDM power sections. In contrast to the traditional ASTM protocols described above, however, these two test methods require large volumes of test drilling fluid to perform each test.

Flow loop testing attempts to simulate downhole PDM service by placing a full downhole motor in an enclosed dynamometer ("dyno"). Drilling fluid is introduced at full operating pressure to drive the PDM power section. It often takes hundreds or even thousands of gallons of drilling fluid to fill and operate the flow loop. Each well drilled may have different drilling fluid types, making a full scale dyno test cost prohibitive to perform on a frequent basis. Further, the specialized equipment required to handle drilling fluids under pressure and high temperature make this approach logistically challenging and often not economically viable.

Recirculating pump vessels have also been used in the past to evaluate the performance of PDMs. While pump vessels do not require the volume of drilling fluid needed by flow loops, pump vessels still require a of 25 gallons of drilling fluid to operate. Further, pump vessels have limited load ranges that correspondingly limit the range of downhole environments that can be simulated.

The volumes of drilling fluid needed by flow loop testing and recirculating pump vessel testing present a further drawback that is inherent to these conventional tests. Often the need for testing and evaluation arises after there has been a specific downhole PDM failure. Investigation of the failure advantageously includes evaluation and testing of the power section in an environment that closely simulates the downhole conditions in which the failure occurred. Such simulation is enhanced greatly when the evaluation and testing can be done using a sample of the actual drilling fluid flowing through the power section at the time the failure occurred. Such samples can be taken, and are available, but they come in small volumes, typically 0.5 to 2 gallons—not nearly enough to do flow loop or recirculating pump vessel testing.

There is therefore a need in the art for a test apparatus that can closely simulate, evaluate and measure PDM performance under (1) the angular acceleration loads encountered downhole, (2) the elevated temperatures encountered downhole (3) the dynamic braking loads encountered downhole, and (4) the cyclic loads encountered downhole. The test apparatus should nonetheless provide embodiments in which only small quantities of drilling, fluid are required, ideally less than about 10 gallons of drilling fluid, preferably less than about 5 gallons and most preferably, less than about 2 gallons. Embodiments of the test apparatus should also ideally have a small enough footprint to be suitable to be housed in a conventional laboratory or at a wellsite location.

SUMMARY AND TECHNICAL ADVANTAGES

These and other drawbacks in the prior art are addressed by a test apparatus using a PDM test coupon that is a partial length of one stage of power section, mounted within a test chamber. In some embodiments, the longitudinal length of the test coupon is up to about 12 inches. The test chamber also holds a small volume of test fluid, sufficient to immerse the test coupon and occupy all of its internal progressing gaps. In some embodiments, the test fluid is drilling fluid maintained at predetermined and monitored elevated temperatures so as to simulate temperature performance in desired downhole conditions. The volume of test fluid drilling fluid required to fill the test apparatus is further advantageously small enough to allow, if desired, use of actual drilling fluid samples drawn from full operational power sections that may have failed downhole. It will be appreciated that the test coupon cannot be sealed because it is only a partial length of one stage of a PDM power section, and thus presents less than one complete progressing cavity. Therefore, the test apparatus does not pump drilling, fluid through the test coupon per the conventional operation of a PDM. Instead, an external motor rotates the rotor section in the test coupon, actuating corresponding rotation of the stator section by contact between rotor section and the stator section. The rotation of the rotor section, with corresponding actuated rotation of the stator section, is all in the presence of test fluid in the progressing gap(s) between rotor section and stator section in the test coupon. In this way, traditional PDM interaction between rotor and stator via drilling fluid flow can be simulated without pumping drilling fluid. The test fluid in the test coupon is present to interact with the test coupon materials to simulate degradation that might be seen in actual downhole conditions. Note that the relative differential rotation of the rotor section and the stator section in the test coupon pray cause the test fluid to flow under pressure through progressing gaps between rotor and stator sections. In some embodiments, a flow loop of test fluid May form through two or more progressing gaps. In other embodiments where openings are provided in the stator section, a flow loop of test fluid may form through the progressing gaps, out of the stator section openings, into the annular space between the test coupon and the test chamber, and back into the progressing gaps again.

Once the rotor section and stator section are rotating, an external brake mechanism intentionally applies a braking torque to the rotation of the stator section against the externally-driven rotation of the rotor, causing the test coupon to come under controlled load. The braking force may be controlled for example, by measuring the output torque of the stator section and adjusting the braking force to obtain a desired torque. This ensures the interface stress between the rotor and stator sections remains constant, resulting in a highly controlled fatigue loading being placed on the test coupon. In some embodiments, such control over braking may be further used to modulate the interface stress between the rotor section and stator section, resulting in a high controlled and dynamic fatiguing load being placed on the test coupon. Controlling the applied torque in this way enables multiple modes of evaluating performance of the test coupon. The performance of the test coupon in the test fluid environment can be monitored continuously over a wide range of dynamic loads placed on the coupon over time. In this way, a stress field can be generated between the rotor and stator sections in the test coupon that simulates very closely the same loading placed on a corresponding full scale power section in downhole service. Variables such as materials selection, performance optimization and useful downhole life, for example, can all be evaluated against the fatigue caused by the loading placed on the test coupon. Performance of the test coupon may be evaluated via measuring metrics including, but not limited to: (1) recording cycles to test coupon failure, via, for example, counting rotor section and/or stator section cycles through to failure, (2) examining the rotor section and/or the stator section for wear, (3) monitoring temperature change over time in the test chamber, and (4) monitoring temperature change over time in an elastomer layer provided by the stator section at its contact surface with the rotor section.

In other embodiments, an external motor may drive the stator section in the test coupon, and an external brake mechanism may intentionally slow the rotor section in order to place load on the test coupon.

In other embodiments, the separate external motors may drive the rotor section and the stator section in the test coupon. Controlled differential rotation of separate motors driving the rotor and stator may be used to place the test coupon under desired loads.

In other embodiments, the disclosed test apparatus provides a method of evaluating PDM power section materials at elevated drilling temperatures and under similar stress profiles as seen in downhole service by full scale PDM power sections. According to currently preferred embodiments, the test apparatus design uses a small section of the full scale PDM power section as a test coupon and preferably less than about two gallons of drilling fluid within the test chamber. Many of the advantages of conventional flow loop or recirculating pump vessel testing can thus be obtained using the disclosed test apparatus, while at the same time obviating the need for large footprint or high volumes of drilling fluid.

In some embodiments, the disclosed test apparatus provides interoperating rotor and stator sections in which the rotor section has straight splines engaged within straight cutouts formed in the stator section. It will be appreciated that in these embodiments the test coupon does not provide progressing cavities (or progressing gaps) on helical pathways formed between rotor and stator as seen in conventional PDMs. However, the artificially-created rotor/stator gear sections provided in these splined test coupon embodiments may be used to simulate desired conditions it the test chamber for evaluation of for example, specific loading or environmental conditions of interest. A specific stress field between rotor and stator sections, for example, or a specific downhole environment, again for example, may be artificially created, simulated and tested. As such, therefore, the scope of this disclosure is not limited to evaluating test coupons that are partial sections of a PDM. Artificially-created splined gearing designs, coupled with specifically selected test fluids and environmental controls, enable simulations and evaluations of load performances outside the boundaries of PDM designs. Such splined gearing designs are particularly useful in evaluating stator performance, although they are not limited to stator evaluation. Such designs are also useful in evaluating the performance of other PDM components, such as rotors, elastomers/rubbers or drilling fluids.

In some embodiments, the disclosed test apparatus provides a variable frequency drive motor (VFDM) to cause external rotation of the rotor section within the test chamber. The VFDM is programmable to deliver varying rotation patterns (e.g. designed increased rotation pulses) to simulate various types of load patterns on the test chamber. In other embodiments, varying braking patterns may be exerted on the stator section within the test chamber by controlling the braking torque exerted on the stator. For example, in embodiments in which braking torque is applied using a pneumatically-driven continuous-slip brake, air pressure pulses delivered to the brake will cause corresponding braking patterns on the stator section, simulating torque pulses on the stator section. Again, various types of load patterns may be simulated on the test chamber.

In some embodiments, the disclosed test apparatus provides a slip clutch and/or variable transmission to engage a variable or single speed motor and cause external rotation of the rotor section within the test chamber. A slip clutch and/or variable transmission may be used to deliver variable rotation patterns to simulate various types of load patterns on the test chamber including, for example, simulating slip-stick loads or torsional resonance loads. In some embodiments, varying braking patterns may be exerted on the stator section within the test chamber by controlling the braking torque exerted on the stator. For example, in embodiments in which braking torque is applied using, a hydraulically-driven continuous-slip brake, hydraulic pressure pulses delivered to the brake will cause corresponding braking patterns on the stator section, simulating torque pulses on the stator section. Various types of load patterns may be simulated on the test chamber.

In some embodiments, the disclosed test apparatus provides rotary encoders to measure/map rotary position separately on the rotor section and the stator section within the test chamber. Comparison of rotary, position data from each rotary encoder enables measurement and evaluation of rotary displacement between the rotor section and the stator section wider load.

In some embodiments, the disclosed test apparatus provides an impact hammer-pin clutch interposed between the external motor and the test chamber. Engagement of the clutch allows torque to be delivered with controlled impacts, thereby simulating torsional impact loading within the test chamber.

In some embodiments, the disclosed test apparatus provides at least one accelerometer on or near the test chamber monitor/map vibration (and changes in vibration patterns) within the test chamber over time during operation.

According to a first aspect, therefore, this disclosure describes an embodiment of a method for measuring load performance of a positive displacement motor (PDM) test coupon, the method comprising the steps of: (a) providing a PDM test coupon, the test coupon comprising a partial length of a PDM stage, the test coupon including a rotor section received inside a stator section, wherein the rotor section and the stator section are independently rotatable, wherein further at least one progressing gap on a helical pathway is formed between the rotor section and the stator section when the rotor section and the stator section are differentially rotated; (b) receiving the test coupon inside a sealable test chamber; (c) filling the test chamber with test fluid; (d) sealing the test chamber; (e) rotating the rotor section, thereby actuating corresponding rotation of the stator section in the presence of test fluid in the progressing gap; (f) applying a braking torque to said stator section rotation actuated in step (e); and (g) responsive to step (f), evaluating performance of the test coupon, wherein said evaluating step includes at least one substep selected from the group consisting of: (g1) controlling torque across the rotor section and the stator section; (g2) counting, through to failure of the test coupon, at least one of (1) rotor section rotation cycles and (2) stator section rotation cycles; (g3) examining at least one of (1) the rotor section and (2) the stator section for wear; and (g4) monitoring temperature change over time in the test chamber.

According to a second aspect, this disclosure describes an embodiment of a method for measuring load performance of a positive displacement motor (PDM) test coupon, the method comprising the steps of: (a) providing a PDM test coupon, the test coupon comprising a partial length of a PDM stage, the test coupon including a rotor section received inside a stator section, wherein the rotor section and the stator section are independently rotatable about a longitudinal rotor axis and a longitudinal stator axis respectively, wherein further the rotor axis and the stator axis are substantially parallel and offset by a preselected axis offset distance, wherein further at least one progressing gap on a helical pathway is formed between the rotor section and the stator section when the rotor section and the stator section are differentially rotated; (b) receiving the test coupon inside a sealable test chamber; (c) filling the test chamber with test fluid; (d) sealing the test chamber; (e) rotating the rotor section, thereby actuating corresponding rotation of the stator section in the presence of test fluid in the progressing gap; (f) applying a braking torque to said stator section rot actuated in step (e); and (g) responsive to step (f), evaluating performance of the test coupon, wherein said evaluating step includes at least one substep selected from the group consisting of: (g1) controlling torque across the rotor section and the stator section; (g2) counting, through to failure of the test coupon, at least one of (1) rotor section rotation cycles and (2) stator section rotation cycles; (g3) examining at least one of (1) the rotor section and (2) the stator section for wear; and (g4) monitoring temperature change over time in the test chamber. According further to the second aspect, embodiments of the test coupon may be selected to be representative of a full size PDM stage having a known rotor/stator eccentricity, in which case the preselected axis offset distance is selected to be substantially the same as the known rotor/stator eccentricity.

Embodiments according to the first or second aspects may also include the stator section providing an elastomer interface at a contact surface with the rotor section inside the test coupon, and in which the evaluating step (g) includes at least one substep selected from the group consisting of: (g1) controlling torque across the rotor section and the stator section; (g2) counting, through to failure of the test coupon, at least one of (1) rotor section rotation cycles and (2) stator section rotation cycles; (g3) examining at least one of (1) the rotor section and (2) the stator section for wear; (g4) monitoring temperature change over time in the test chamber; and (g5) monitoring temperature change over time in the elastomer interface.

In other embodiments according to the first or second aspects, the at least one progressing gap comprises a plurality of progressing gaps, and in which a first flow loop of test fluid is formed through the plurality of progressing gaps when the test chamber is sealed and the rotor section is rotated.

In other embodiments according to the first or second aspects, an annular cavity is formed between external periphery of the stator section and an internal periphery of the test chamber, wherein the at least one progressing, gap, a plurality of openings in the stator section, and the annular cavity form a second flow loop of test fluid when the test chamber is sealed and the rotor section is rotated.

According to third and other aspects and embodiments, step (c) of the method according to the first or second aspects requires no more than about 25 gallons of test fluid, and most preferably, no more than about 2 gallons of test fluid. Embodiments of the test coupon may have an overall longitudinal length of no more than about 12 inches. Embodiments of the method according the first or second aspects may further comprise further steps of maintaining a preselected temperature and/or pressure inside the test chamber during at least steps (e) and (f). Embodiments of the test coupon may further be cut from a full size PDM stage through which drilling fluid was previously caused to flow. Step (f) of the method according to the first or second aspects may be accomplished using a continuous-slip brake.

According to a fourth aspect, this disclosure describes an embodiment of a method for evaluating load performance of a rotor/stator test coupon, the method comprising the steps of; (a) providing a test coupon, the test coupon including a splined rotor section received inside a splined stator section, wherein an exterior of the splined rotor section provides a plurality of rotor splines and an interior of the stator section provides a plurality of splined stator cutouts for receiving rotor splines; (b) rotating a rotated first one of the splined rotor section and the splined stator section, wherein rotation of the rotated first one of the splined rotor section and the splined stator section actuates corresponding rotation of an actuated second one of the splined rotor section and the splined stator section; (c) applying a braking torque to the actuated second one of the splined rotor section and the splined stator section; and (d) responsive to step (c), evaluating load performance of the test coupon. In some embodiments, the splined rotor section rotates about a longitudinal rotor rotation axis and the splined stator section rotates about a longitudinal stator rotation axis. In such embodiments, step (b) may include setting a preselected offset distance between the rotor rotation axis and the stator rotation axis. In such embodiments, the rotor splines may be disposed parallel to the longitudinal rotor rotation axis and the splined stator section cutouts may be disposed parallel to the longitudinal stator rotation axis. In other embodiments, the splined stator section may provide an elastomer interface at a contact surface with the splined rotor section inside the test coupon. In such embodiments, step (d) may include at least one substep selected from the group consisting of: (d1) controlling torque across the splined rotor section and the splined stator section; (d2) counting, through to failure of the test coupon, at least one of (1) splined rotor section rotation cycles and (2) splined stator section rotation cycles; (d3) examining at least one of (1) the splined rotor section and (2) the splined stator section for wear; and (d4) monitoring temperature change over time in the elastomer interface.

In other embodiments according to the fourth aspect, step (d) may include at least one substep selected from the group consisting of: (d1) controlling torque across the splined rotor section and the splined stator section; (d2) counting, through to failure of the test coupon, at least one of (1) splined rotor section rotation cycles and (2) splined stator section rotation cycles; and (d3) examining at least one of (1) the splined rotor section and (2) the splined stator section for wear. In other embodiments according to the fourth aspect, the method may further comprise, after step (a) and before step (b), the substeps of: (a1) receiving the test coupon inside a sealable test chamber; (a2) filling the test chamber with test fluid; and (a3) sealing the test chamber. In such embodiments, step (d) may further include the substep of monitoring temperature change over tinge in the test chamber. In such embodiments, the splined stator section may provide an elastomer interface at a contact surface with the splined rotor section inside the test coupon, wherein step (d) further includes the substep of monitoring temperature change over time in the elastomer interface.

According to a fifth aspect, this disclosure describes an embodiment of a method for evaluating load performance of a rotor/stator test coupon, the method comprising the steps of: (a) providing a test coupon, the test coupon including a rotor section received inside a stator section; (b) rotating a rotated first one of the rotor section and the stator section with non-linear torque, wherein rotation of the rotated first one of the rotor section and the stator section actuates corresponding rotation of an actuated second one of the rotor section and the stator section; (c) applying a braking torque to the actuated second one of the rotor section and the stator section; and (d) responsive to step (c), evaluating load performance of the test coupon. In some embodiments according to the fifth aspect, the non-linear torque in step (b) may be delivered by at least one technique selected from the group consisting of: (1) engaging an impact hammer-pin clutch when rotating the rotated first one of the rotor section and the stator section; (2) deploying a variable frequency drive motor to vary rotation speed of the rotated first one of the rotor section and the stator section; and (3) variably applying a braking torque to the actuated second one of the rotor section and the stator section.

According to a sixth aspect, this disclosure describes an embodiment of a method for evaluating load performance of a rotor/stator test coupon, the method comprising the steps of: (a) providing a test coupon, the test coupon including a rotor section received inside a stator section; (b) rotating a rotated first one of the rotor section and the stator section, wherein rotation of the rotated first one of the rotor section and the stator section actuates corresponding rotation of an actuated second one of the rotor section and the stator section; (c) applying a braking torque to the actuated second one of the rotor section and the stator section; (d) during steps (b) and (c), independently monitoring at least one of (1) an angular position of the rotor section over time, and (2) an angular position of the stator section over time; and (e) responsive to steps (b) through (d), evaluating load performance of the test coupon with reference to angular position as monitored in step (d) over time. In some embodiments according to the sixth aspect, angular position in step (d) may be monitored using at least one rotary encoder.

In some embodiments according to the fifth, sixth and other aspects, the rotor section rotates about a longitudinal rotor rotation axis and the stator section rotates about a longitudinal stator rotation axis. In such embodiments, step (b) may include setting a preselected offset distance between the rotor rotation axis and the stator rotation axis. In other embodiments, step (d) may include at least one substep selected from the group consisting of: (d1) controlling torque across the rotor section and the stator section; (d2) counting, through to failure of the test coupon, at least one of (1) rotor section rotation cycles and (2) stator section rotation cycles; and (d3) examining at least one of (1) the rotor section and (2) the stator section for wear. In other embodiments, the test coupon may comprise at least a partial length of a positive displacement motor (PDM) stage. In other embodiments, at least one progressing gap on a helical pathway may form between the rotor section and the stator section when the rotor section and the stator section are differentially rotated. In other embodiments, the stator section may provide an elastomer interface at a contact surface with the rotor section inside the test coupon, wherein step (d) includes at least one substep selected from the group consisting of: (d1) controlling torque across the rotor section and the stator section; (d2) counting, through to failure of the test coupon, at least one of (1) rotor section rotation cycles and (2) stator section rotation cycles; (d3) examining at least one of (1) the rotor section and (2) the stator section for wear; and (d4) monitoring temperature change over time in the elastomer interface.

According to a seventh aspect, this disclosure describes an embodiment of a method for evaluating load performance of a rotor/stator test coupon under a dynamic load, the method comprising the steps of: (a) providing a test coupon, the test coupon including a rotor section received inside a stator section; (b) rotating a rotated first one of the rotor section and the stator section with non-linear torque, wherein rotation of the rotated first one of the rotor section and the stator section actuates corresponding rotation of an actuated second one of the rotor section and the stator section; (c) applying a braking torque to the actuated second one of the rotor section and the stator section; and (d) responsive to step (b), evaluating load performance of the test coupon. In some embodiments according to the seventh aspect, the non-linear torque in step (b) may be delivered by at least one technique selected from the group consisting of: (1) engaging a slip clutch when rotating the rotated first one of the rotor section and the stator section; (2) engaging a variable transmission when rotating the rotated first one of the rotor section and the stator section; and (3) deploying a variable frequency drive motor to vary rotation speed of the rotated first one of the rotor section and the stator section. In other embodiments according to the seventh and other aspects, step (b) includes the substeps of: (b1) rotating a rotated first one of the rotor section and the stator section with a first motor; (b2) rotating a flywheel with a second motor; (b3) disengaging the first motor from the rotated first one of the rotor section and the stator section; and (b4) engaging the rotating flywheel onto the rotated first one of the rotor section and the stator section. In further embodiments, step (b) further includes the substeps of: (b5) disengaging the rotating flywheel from the rotated first one of the rotor section and the stator section; and (b6) reengaging the first motor onto the rotated first one of the rotor section and the stator section. In further embodiments, substep (b4) increases a current rotational speed of the rotated first one of the rotor section and the stator section. In further embodiments, substep (b4) increases a first and current rotational speed of the rotated first one of the rotor section and the stator section to a second rotational speed, wherein the second rotational speed is at least three times faster than the first rotational speed. In further embodiments, the non-linear torque in step (b) may be cyclical. In further embodiments, such cyclical non-linear torque has a frequency in a range between about 0.01 Hz and about 10 Hz. In further embodiments, the method of the seventh and other aspects further comprises, after step (a) and before step (b), the substeps of: (a1) receiving the test coupon inside a sealable test chamber; (a2) filling the test chamber with test fluid; and (a3) sealing the test chamber. In such sealable test chamber embodiments including a sealable test chamber, step (d) may further include the substep of monitoring temperature change in the test chamber over time. In further embodiments of the method of the seventh and other aspects, the stator section provides an elastomer interface at a contact surface with the rotor section inside the test coupon, and step (d) includes at least one substep selected from the group consisting of: (d1) controlling torque across the rotor section and the stator section; (d2) counting, through to failure of the test coupon, at least one of (1) rotor section rotation cycles and (2) stator section rotation cycles; (d3) examining at least one of (1) the rotor section and (2) the stator section for wear; and (d4) monitoring temperature change in the elastomer interface over time. In further embodiments in which the stator section provides an elastomer interface at a contact surface with the rotor section inside the test coupon, step (d) may further include the substep of monitoring temperature change in the test coupon over time.

According to an eighth aspect, this disclosure describes an embodiment of a testing apparatus comprising: a first motor, the first motor configured to rotate a first shaft, wherein the first shaft is rotationally coupled to a first one of a rotor section and a stator section and wherein rotation of the first one of the rotor section and the stator section actuates corresponding rotation of a second one of the rotor section and the stator section; a second motor, the second motor configured to rotate a flywheel; a clutch, the clutch configured to selectively rotationally couple the flywheel to the first shaft; and a first brake, the first brake configured to apply a braking force to a second shaft, wherein the second shaft is rotationally coupled to the second one of the rotor section and the stator section. In some embodiments, the clutch is a magnetic slip clutch. In further embodiments, the testing apparatus further comprises a torque sensor, the torque sensor configured to monitor a torsional force generated between the rotor section and the stator section. In further embodiments, the testing apparatus further comprises a second brake, wherein the first brake is configured to selectively apply a static braking force and the second brake is configured to selectively apply a dynamic braking force. In further embodiments, the first brake may be actuated pneumatically. In further embodiments, the second brake may be actuated by an actuation mechanism selected from the group consisting of: (1) a hydraulic actuation mechanism and (2) an electromagnetic actuation mechanism. In further embodiments, the second brake applies a cyclical braking force. In some embodiments the cyclical braking force is at a frequency in a range between about 1 Hz and about 10 Hz. In further embodiments, the test apparatus further comprises a test chamber, the rotor section and the stator section disposed within the test chamber, the test chamber configured to hold a test fluid under seal. In such test chamber embodiments, the testing apparatus may further comprise a temperature sensor, the temperature sensor configured to monitor temperature within the test chamber over time.

According to an ninth aspect, this disclosure describes an embodiment of a torsional resonance testing, apparatus comprising: a motor, the motor configured to rotate a first shaft. Wherein the first shall is rotationally coupled to a first one of a rotor section and a stator section and wherein rotation of the first one of the rotor section and the stator section actuates corresponding rotation of a second one of the rotor section acid the stator section; a first brake, the first brake configured to apply a dynamic braking force to a second shall, wherein the second shaft is rotationally coupled to the second one of the rotor section and the stator section, wherein the first brake is hydraulically actuated via a hydraulic solenoid; a processor operably connected to the hydraulic solenoid; and a torque sensor in data communication with the processor, the torque sensor configured to monitor the torsional force generated between the rotor section and the stator section. In some embodiments, the motor may be a variable frequency drive motor (VFDM), wherein the VDFM rotates at speeds responsive to instructions from the processor; and the processor may be configured to rotate the first shaft, via the VDFM, between a first rotational speed and a second rotational speed. In some embodiments, the second rotational speed is at least three times faster than the first rotational speed. In further embodiments according to the ninth aspect, the testing apparatus may further comprise a variable transmission, the variable transmission configured to rotationally couple the motor to the first shaft. In further embodiments according to the ninth aspect, the testing apparatus may further comprise a test chamber, the rotor section and the stator section disposed within the test chamber, the test chamber configured to hold a test fluid under seal. In such test chamber embodiments, the testing apparatus may further comprise a temperature sensor, the temperature sensor in data communication with the processor, the temperature sensor configured to monitor temperature within the test chamber over time.

It is therefore a technical advantage of the disclosed test apparatus to miniaturize the performance testing of PDM power sections in downhole conditions by accurately simulating such conditions (for example, temperature and stress loading) in a partial section of one stage of a PDM power section. The footprint of the disclosed test apparatus is suitable to house the apparatus in a conventional laboratory or even at the wellsite.

A further technical advantage of the disclosed test apparatus is to provide a PDM test apparatus that enables performance testing using a small volume of drilling fluid. In this way, if desired, the disclosed test apparatus can accurately simulate downhole service conditions using samples of actual drilling fluid extracted from a PDM previously in downhole service (such samples known to be available only in small quantities).

A further technical advantage of the disclosed test apparatus is to avoid eccentric rotation vibration in the PDM power section test coupon during testing. By avoiding such vibration, the disclosed test apparatus enables performance evaluation of a PDM power section test coupon that is isolated from the effects of vibration caused by the eccentric rotation of the rotor within the stator. Conventionally, the construction of PDM power sections provides a hard (e.g. metal) rotor surface contacting a resilient stator (usually providing an elastomer or rubber through part or all of its cross-section). In normal PDM power section operations, the eccentric rotation of the rotor within the stator imparts cyclic loads (including, without limitation, compressive, shear and tensile loads) on the resilient stator material, particularly on the stator lobes. These loads imparted by cyclic contact are all included in the suite of performance metrics sought to be simulated and evaluated by the disclosed test apparatus.

However, the eccentric rotation of the rotor during normal PDM power section operations also creates many modes of vibration throughout the PDM assembly and elsewhere on the drill string. The rotor on a full-size downhole PDM distributes torque and tilting reaction forces along the full length of the elastomer component of the stator. The large length to diameter ratio of the power section allows these forces to be distributed along the length of multiple power section stages. The PDM, over its entire multi-stage length, can therefore absorb the vigorous dynamic forces created as the rotor orbits eccentrically in the stator. In contrast, the disclosed test apparatus evaluates performance on only a partial section of one PDM power section stage. It is therefore not possible in the disclosed test apparatus to stabilize the rotor section within the test coupon against the vibrational effect of eccentric rotation and tilting forces as might be seen in "live" downhole operations, since the length of the rotor section in the test coupon is too short to have sufficient longitudinal flexure to compensate for eccentric rotation vibration.

Embodiments of the disclosed test apparatus therefore substantially eliminate eccentric rotation vibration from the test coupon by setting and holding the rotor rotation axis on a predetermined, fixed offset from the stator rotation axis. The offset is selected to be approximately equal to the design eccentricity of the full-size, operational power section whose performance the test coupon seeks to replicate and evaluate. The disclosed test apparatus thus generates test results that reflect performance isolated from substantially all eccentric rotation vibration, in a test coupon that can be very short in length and requiring only a small volume of drilling fluid. In this way, the results generated by the disclosed test apparatus will more accurately predict corresponding or vibration-compensated or vibration-isolated performance expected in full-size PDM power sections operating downhole.

The disclosed test apparatus provides yet a further advantage in embodiments in which eccentric rotation vibration is substantially eliminated. In embodiments where an offset is provided between axes of rotor rotation and stator rotation (in order to elimination eccentric rotation vibration), the external drive train rotating the rotor is greatly reduced in complexity which still giving a very accurate stress field within the test coupon. In embodiments where an offset is not provided between axes of rotor rotation and stator rotation, a transmission is required in the external drive train to counteract or eliminate eccentric rotation vibration. The rotor must also be longer in such embodiments in order to generate flexure. Such an additional transmission and rotor length adds cost, complexity, and inevitably (1) increases potential footprint and (2) requires a higher volume of drilling fluid.

The disclosed test apparatus provides yet a further advantage in embodiments in which non-linear torque may be applied to the test coupon within the test chamber. Non-linear torque may be used to simulate loading conditions on the test coupon found, for example, in downhole environments where inhomogeneous formations are encountered. Such non-linear torque may be provided by programming speed pulses, for example, into the rotation delivered to the rotor section. Speed pulses or other sources of non-linear torque loads may be delivered to the rotor section using (1) a slip clutch; (2) a variable transmission; (3) a variable frequency drive motor (VFDM); (4) a rotating fly-wheel; or (5) a second motor. Additionally, braking torque pulses, for example, may be applied to the stator section via (1) pulsing the air supply to a pneumatically-driven brake applying load to the rotating test coupon, (2) pulsing the hydraulic fluid supply to a hydraulically-driven brake applying load to the rotating test coupon, of (3) electronically pulsing an electromagnetically driven brake applying load to the rotating test coupon. Alternatively, an impact hammier pin clutch may be interposed between an external motor and the test chamber to generate non-linear torque or impact loading.

The disclosed test apparatus provides yet a further advantage in embodiments in which independent rotary encoders are provided on each of the rotor and stator sections. Comparison of data from the rotary encoders enable evaluation of load performance with reference to relative angular positions of the rotor section and the stator section over time. In this way, torsional flex of the rotor section may be monitored. Alternatively, rotary displacement between the rotor and stator sections may be monitored dating operation. It will be understood that such rotary displacement is often caused by torsional compression of elastomer lobes on the stator section responsive to torque exerted thereon by lobes on the rotor section.

The foregoing has rather broadly outlined some features and technical advantages of the disclosed test apparatus, in order that the following detailed description may be better understood. Additional features and advantages of the disclosed technology may be described. It should be appreciated by those skilled in the art that the conception and the specific embodiments disclosed may be readily utilized as a basis for modifying or designing other structures for carrying out the same inventive purposes of the disclosed technology, and that these equivalent constructions do not depart from the spirit and scope of the technology as described.

BRIEF DESCRIPTION OF THE DRAWINGS

For a more complete understanding of embodiments described in detail below, and the advantages thereof, reference is now made to the following drawings, in which:

FIGS. 5 and 5A illustrate two different embodiments of test chamber 325 in cutaway view, in which test fluid 323 may follow different flow loops FL1 and FL2;

FIG. 6 illustrates exemplary embodiments of drive train 310 as more generally illustrated on FIG. 3;

FIGS. 7A and 7B illustrate alternative test bed embodiments 700 and 702, respectively;

DETAILED DESCRIPTION

Figure 1E:
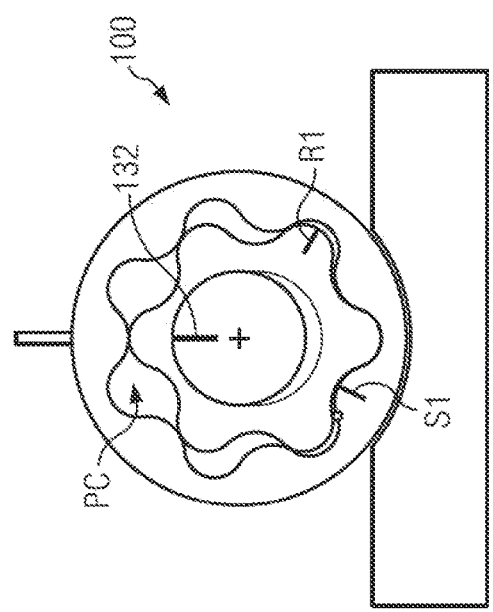
FIGS. 1-A through 1-J depict the operation of a conventional power section 100 in a series of freeze-frame cutaway section views of the conventional power section in operation.
Figure 1F:
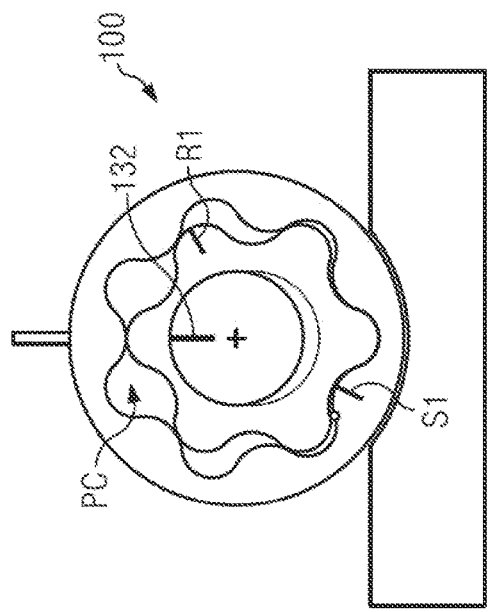
Figure 1G:
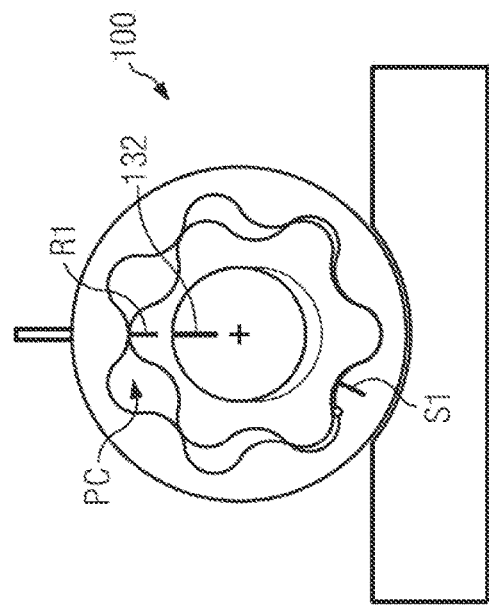
Figure 1H:
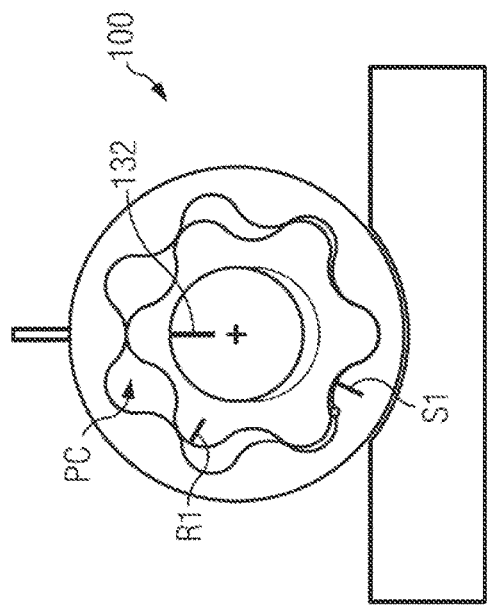
Figure 2A:
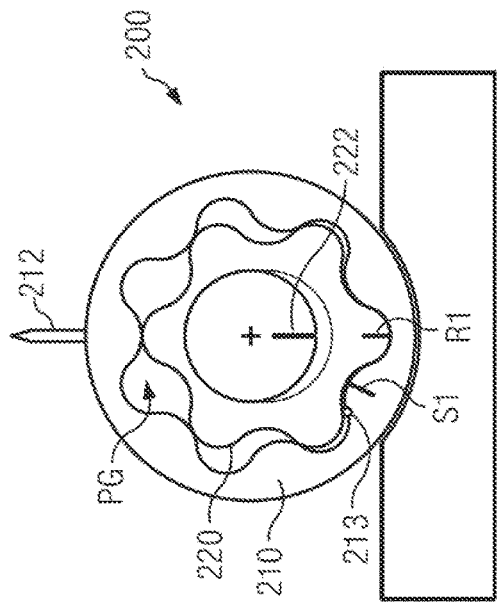
FIGS. 2-A through 2-J depict movement of corresponding components to FIGS. 1-A through 1-J in the disclosed new test apparatus 200, wherein such movement is also depicted in a series of freeze-frame cutaway section views.
Figure 2B:
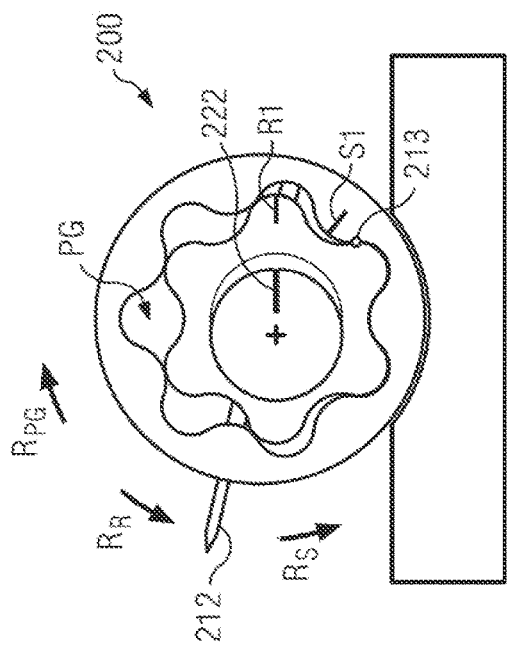
Figure 1I:
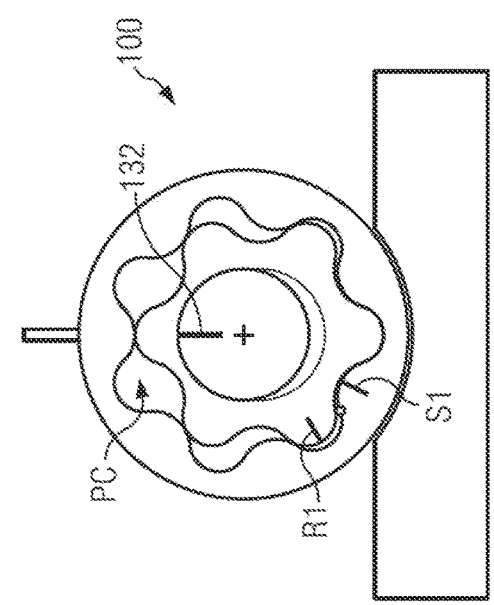
Figure 1J:
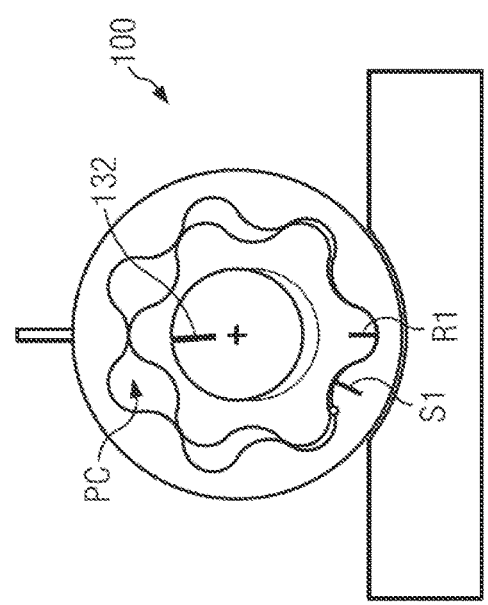
Figure 2I:
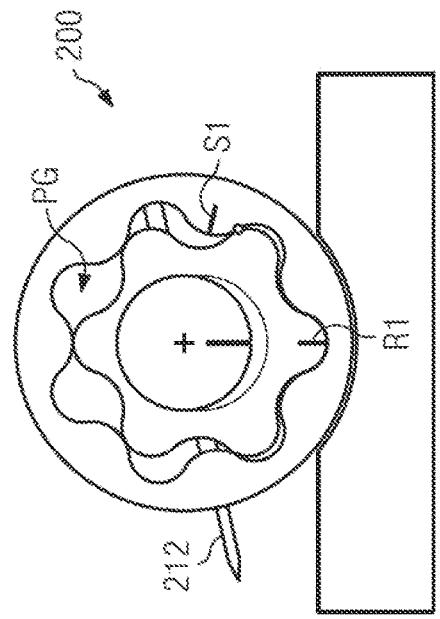
Figure 2J:
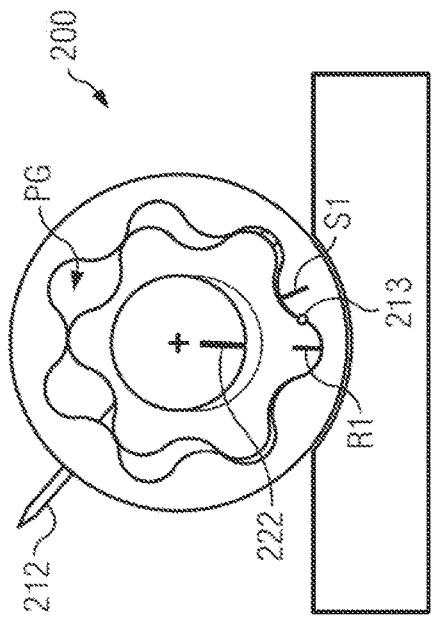
Figure 2G:
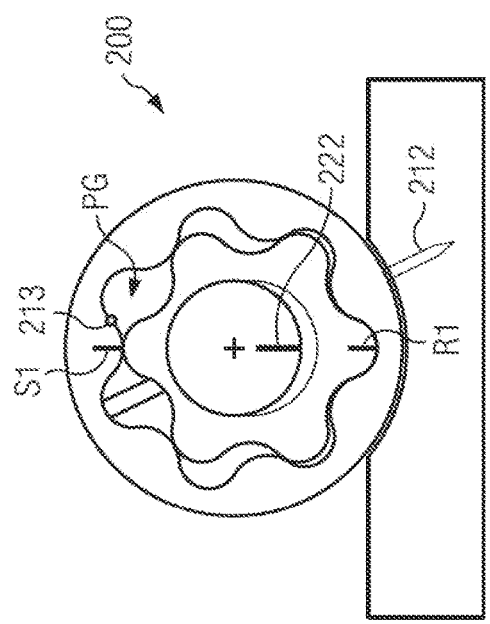
Figure 2H:
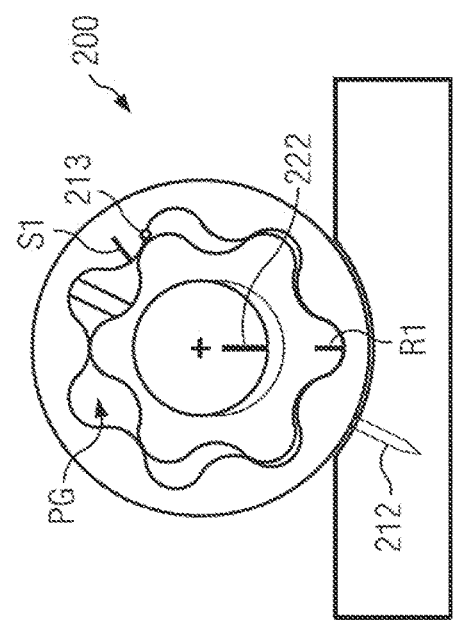

As discussed summarily above in this disclosure, this application is directed to a PDM testing apparatus using a rotor/stator test coupon that is a partial length of one stage of a power section. A stage of a power section is defined by the minimum length to seal a single helical progressing cavity. The relationship describing the helical length of a single progressing cavity is based on the rotor to stator lobe count ratio and can be expressed as:

Stator Pitch Length=$(N+1)/N$×Rotor Pitch Length

Stator pitch length is a PDM design parameter chosen to give the desired volumetric fluid flow ratio for the selected rotor/stator configuration.

FIGS. 1-A through 1-J depict the mechanics of a conventional progressing cavity power section, as is well known in the prior art. Such progressing cavity power sections are also well known as "Moineau" devices. FIGS. 1-A through 1-J depict the operation of such a conventional power section 100 in a series of freeze-frame cutaway section views of the power section in operation. The series of freeze-frame views depicted in FIGS. 1-A through 14 are in sequence. Parts and other features of conventional power section 100 are identified by reference number or letter, as described in detail further below. Where the same reference number or letter is used in FIGS. 1-B through 1-J, the same part or feature of power section 100 is being identified on that Figure as depicted on FIG. 1-A. In this way, reference numbers and letters on FIGS. 1-B through 1-J can be omitted for clarity on some views while still allowing the reader to understand the subject matter depicted on FIGS. 1-B through 1-J.

As noted, power section 100 as depicted in FIGS. 1-A through 14 is conventional. Such power sections are designed using intermeshing continuous helical pathways that provide, in cross section, cooperating lobed gear profiles that intermesh with one another in an "n" and "n+1" combination. Typically, the inner rotor has n lobes and the outer stator gear has n+1 lobes. Referring to FIG. 1A, rotor 120 is depicted with 6 lobes, and stator 110 has 7 lobes, although these values are purely by way of example. As will be seen generally from FIGS. 1A through 1-J viewed in sequence, the precise cross-sectional profiles of these these-gear-within-a-gear devices are normally described by hypocycloid geometry created by rolling circle techniques. The resulting gear devices are helically swept over the axial lengths of the rotor and stator. The intermeshing along the axial length creates progressing cavities on a helical pathway between the rotor and stator, identified in cross-section on FIG. 1A as PC, through which a flow of fluid drives rotor 120 around the inner periphery of stator 110.

The hypocycloid geometry of the intermeshed lobes on rotor 120 and stator 110 thus compels that in conventional PDM power sections such as power section 100 on FIG. 1-A, rotor 120 orbits within stator 110 at a known eccentricity from a central longitudinal axis. This eccentricity is a derived relationship and is related to the curvature and lobe heights generated from the mathematical expressions defining hypocycloid and true rolling motion used in the rotor and stator geometries. Review of FIGS. 1-A through 1-J in sequence illustrate this conventional eccentricity in more detail.

Referring first to FIG. 1-A, stator 110 includes rotational marker 112 and point marker 113. Rotational marker 112 sets a fixed point on the outer periphery of stator 110, and point marker 113 sets a fixed point on the inner periphery of stator 110 (adjacent reference point "S1" on stator 110). It will be seen that the location of markers 112 and 113 on subsequent views in FIGS. 1-B through 1-J does not change, indicating that stator 110 is stationary throughout the operation of conventional power section 100 depicted by FIGS. 1-A through 1-J.

With further reference to FIG. 1-A, rotor 120 includes fixed reference point "R1" on the outer periphery of one of its lobes. FIG. 1-A also shows progressing cavity (PC) position marker 130, on which PC marker line 132 indicates the position of the approximate most open point of progressing cavity PC. PC position Marker 130 rotates in synch with progressing cavity PC around a central longitudinal axis through stator 110. PC position marker 130 thus also serves to illustrate and highlight the eccentric rotation of rotor 120 within stator 110. It will be seen on FIG. 1-A that that PC position larker 130 is offset from a central longitudinal axis through rotor 120.

Referring now to FIG. 1-B, a flow of drilling fluid (not illustrated) has displaced rotor 120 within stator 110 such that progressing cavity PC has rotated approximately 90 degrees clockwise within stator 110 from the corresponding progressing cavity position depicted on FIG. 1-A. This rotation of progressing cavity PC is illustrated by the new position of PC marker line 132 on FIG. 1-B, as well as a new general position on FIG. 1-B of progressing cavity PC. FIG. 1-B also shows that in response to clockwise movement of PC, rotor 120 has rotated counterclockwise as shown by the new position of rotor reference point R1. FIG. 1-B illustrates the clockwise movement of progressing cavity PC by arrow $R_{PC}$, and the responsive counterclockwise movement of rotor 120 by arrow $R_R$.

FIG. 1-C illustrates that the flow of drilling fluid has displaced rotor 120 within stator 110 such that progressing cavity PC has rotated approximately a further 90 degrees clockwise within stator 110 from the corresponding progressing cavity position depicted on FIG. 1-B. The relative movement of components within stator 110 can be seen from the new positions of progressing cavity PC, PC marker line 132 and rotor reference point R1 on FIG. 1-C, as compared to their corresponding positions on FIGS. 1-A and 1-B.

FIGS. 1-D and 1-E each show a further rotation of approximately 90 degrees clockwise of progressing cavity PC over the previously illustrated positions. Again, the relative movement of components within stator 110 can be seen from the new positions of progressing cavity PC, PC marker line 132, and rotor reference point R1 on each advancing view on FIGS. 1-A through 1-E. It will be appreciated that on FIG. 1-E, progressing cavity PC has made one complete revolution of stator 110 over the starting position on FIG. 1-A.

FIGS. 1-F through 1-J illustrate the counterclockwise rotation of rotor 120 within stator 110 responsive to subsequent full revolutions clockwise of progressing cavity PC. In each of FIGS. 1-A, and then 1-F through 1-J, progressing cavity PC has made one further full clockwise revolution over the previously illustrated view. When FIGS. 1-A, and then 1-F through 1-J are viewed in sequence, the new position of rotor reference point R1 can be seen in response to one additional revolution of progressing cavity PC. It will be appreciated that in FIG. 1-J, progressing cavity PC has made 6 clockwise revolutions of stator 110 over the view depicted in FIG. 1-A, during which time rotor reference point R1 has made one counterclockwise revolution, indicating that the eccentricity of rotor 120 within stator 110 is in the same state in FIG. 1-J as it was initially in FIG. 1-A.

As noted throughout the disclosure immediately above, FIGS. 1-A through 1-J illustrate movement of components within a conventional power section 100. FIGS. 2-A through 2-J depict movement of corresponding components within the disclosed new test apparatus 200. As with FIGS. 1-A through 1-J, FIGS. 2-A through 2-J depict such movement within test apparatus 200 in a series of freeze-frame cutaway section views of the test apparatus in operation. The series of freeze-frame views depicted in FIGS. 2-A through 2-J are in sequence. Similar to conventional power section 100 depicted in FIGS. 1-A through 1-J, test apparatus 200 in FIGS. 2-A through 2-J provides a rotor 220 with 6 lobes operating inside a stator 210 with 7 lobes. Where the same reference number or letter is used in FIGS. 2-A through 2-J, the same part or feature of test apparatus 200 is being identified. In this way, reference numbers and letters on FIGS. 2-A through 2-J can be omitted for clarity on some views while still allowing the reader to understand the subject matter depicted on FIGS. 2-A through 2-J.

The "Summary" section describes above how the disclosed test apparatus 200 tests less than one full length of a full downhole PDM power section stage, and thus necessarily cannot provide a series of full progressing cavities (one full stage of a power section being defined by the minimum length to seal a single helical progressing cavity, see above). Test apparatus 200 thus cannot be sealed to operate conventionally with moving drilling fluid driving a rotor in a stationary stator (as illustrated and described above with reference to FIGS. 1-A through 1-J). Test apparatus 200 thus does not provide progressing cavities as illustrated as PC on FIGS. 1-A through 1-J. In contrast, as illustrated on FIGS. 2-A though 2-J, test apparatus 200 provides progressing gaps PG on helical pathways formed between rotor 220 and stator 210 when rotor 220 and stator 210 are differentially rotated. Progressing gaps PG on FIGS. 2-A though 2-J are necessarily only a partial section of corresponding progressing cavities PC found on a fill PDM power stage, as illustrated on FIGS. 1-A through 1-J.

In operation, currently preferred embodiments of test apparatus 200 on FIGS. 2-A through 2-J provide an external motor (not illustrated on FIGS. 2-A through 2-J) to rotate rotor 220 while submersed in test fluid/drilling fluid inside stator 210. As rotor 220 rotates, it actuates corresponding rotation of stator 210 via contact between rotor 220 and stator 210. An external brake mechanism (again not illustrated on FIGS. 2-A through 2-J) is then activated to apply braking torque to intentionally slow the rotation of stator 210 against the powered rotation of rotor 220. Applied braking torque can be finely controlled. In this way, a controlled stress field can be intentionally introduced on the components inside test apparatus 200 that approximate closely in kind, location, and strength the operational stresses experienced inside conventional power section 100 on FIGS. 1-A through 1-J when drilling fluid is pumped through progressing cavity PC to rotate rotor 120 within stationary stator 110.

Looking at FIGS. 2-A through 2-J in more detail, FIG. 2-A illustrates test apparatus 200 with the following parts and features, many of which are counterparts to the corresponding parts and features described above with respect to FIGS. 1-A through 1-J:

Stator 210
Stator rotational marker 212
Stator point marker 213
Stator reference point S1
Rotor 220
Rotor reference point R1
Progressing gap PG along the axial length of rotor 220 and stator 210, on a helical pathway formed between rotor 220 and stator 210 when rotor 220 and stator 210 are differentially rotated.

Additionally, FIG. 2-A illustrates rotor rotation marker line 222, which, along with rotor reference point R1, indicates rotation of rotor 220 relative to other components in test apparatus 200 as views advance through FIGS. 2-A through 2-J.

Referring now to FIG. 2-B, external rotor motor (not illustrated) has rotated rotor 220 approximately 90 degrees counterclockwise within stator 210 from the corresponding position of rotor 220 depicted on FIG. 2-A. As a result, rotational motion forces from rotor 220 have exerted themselves on stator 210, actuating rotation of stator 210 in a counterclockwise direction. This displacement of stator 210 can be seen by comparing the relative positions of stator rotational marker 212, stator point marker 213 and stator reference point S1 on FIG. 2-B as compared to FIG. 2-A. Additionally, the displacement of rotor 220 by approximately 90 degrees counterclockwise in FIG. 2-B has caused progressing gap PG to move in a clockwise direction away from its corresponding position in FIG. 2-A. This clockwise movement of progressing gap PG is best seen by comparing its displaced position relative to stator rotational marker 212 in FIG. 2-A and then FIG. 2-B. FIG. 2-B illustrates the counterclockwise movement of rotor 220 by arrow $R_R$, the responsive counterclockwise movement of stator 210 by arrow $R_S$, and the resulting clockwise movement of progressing gap PG by arrow $R_{PG}$.

FIG. 2-C illustrates that external rotor motor (not illustrated) has rotated rotor 220 approximately 90 degrees further counterclockwise within stator 210 from the corresponding position of rotor 220 depicted on FIG. 2-B. As a result, rotational motion forces from rotor 220 have acted on stator 210, causing stator 210 to rotate further in a counterclockwise direction. This displacement of stator 210 can be seen by comparing, the relative positions of stator rotational marker 212, stator point marker 213 and stator reference point S1 on FIG. 2-C as compared to FIG. 2-B. Additionally, the displacement of rotor 220 by approximately 90 degrees further counterclockwise in FIG. 2-C has caused progressing gap PG to move in a clockwise direction away from its corresponding position in FIG. 2-B, as seen by comparing, the position of progressing gap PG in FIG. 2-C relative to stator rotational marker 212 in FIG. 2-B.

FIGS. 2-D and 2-E each show a further rotation of approximately 90 degrees counterclockwise of rotor 220 over the previously illustrated positions. Again, the relative movement of components within stator 210 can be seen from the new positions of rotor rotation marker line 222, rotor reference point R1, stator rotational marker 212, stator point marker 213, stator reference point S1, and progressing gap PG on each advancing view on FIGS. 2-A through 2-E. It will be appreciated that on FIG. 2-E, external rotor motor (not illustrated) has caused rotor 220 to make one complete revolution of stator 210 over the starting position on FIG. 2-A.

FIGS. 2-F through 2-J illustrate the counterclockwise rotation of stator 210 responsive to subsequent full revolutions counterclockwise of rotor 220. In each of FIGS. 2-A, and then 2-F through 2-J, rotor 220 has made one further full counterclockwise revolution over the previously illustrated view. When FIGS. 2-A, and then 2-F through 2-J are viewed in sequence, the new relative position of stator rotational marker 212, stator point marker 213, stator reference point S1, and progressing gap PG can be seen in response to one additional revolution of rotor 220. It will be appreciated that in FIG. 2-J, rotor reference point R1 has made 6 counterclockwise revolutions as compared to the view depicted in FIG. 2-A, during which time stator reference point S1 has made almost one counterclockwise revolution in the orbital distance separating rotor reference point R1 and stator reference point R1 during rotation. It will be appreciated that with one further complete counterclockwise revolution of rotor reference point R1 (a seventh overall rotation), stator reference point S1 will have made one complete counterclockwise revolution in the orbital distance separating rotor reference point R1 and stator reference point S1, and will further have returned to the same position relative to rotor reference point R1 as depicted in FIG. 2-A.

Returning now to view FIGS. 1-A through 1-E in sequence, it will be appreciated rotor 120 is in an eccentric orbit within stator 110 during in the operation of conventional power section 100. Conventionally, the construction of PDM power sections provides a hard (e.g. metal) rotor surface contacting a resilient stator (usually providing an elastomer or rubber through part or all of its cross-section).

As described above in the "Summary" section, in normal PDM power section operations, the eccentric rotation of the rotor within the stator imparts cyclic loads (including, without limitation, compressive, sheer and tensile loads) on the resilient stator material, particularly on the stator lobes. The eccentric rotation of the rotor during normal PDM power section operations also creates many modes of vibration throughout the PDM assembly and elsewhere on the drill string. It will be appreciated that these vibrations, as experienced downhole, can be addressed over the length of a full power section stage by fixing the ends of the rotor and allowing the natural flexure of the rotor to compensate. However, in short lengths of conventional power section configured according to FIGS. 1-A through 1-E, such eccentric rotation vibrations cannot easily be compensated for, since the rotor is too short to have the required flexure.

Turning now to view FIGS. 2-A through 2-E in sequence, it will be appreciated that embodiments of the disclosed test apparatus 200 are reconfigured in a way to optimize, and in some cases to substantially eliminate, any eccentric rotation vibration that might potentially arise in the test coupon, so that performance evaluation of the components of the test coupon can be conducted free of the effects of such vibration. FIGS. 2-A through. Show that stator 210 and rotor 220 each rotate independently about their own fixed, substantially parallel longitudinal axes, and that the rotor rotation axis is set at a fixed offset distance from the stator rotation axis. The fixed offset distance is a predetermined design choice, selected according to the size and lobe count of the rotor and stator, and further according to the amount of operational contact desired by the rotor on the stator as the rotor is externally rotated. Comparison should now be made with the eccentric orbit of rotor 120 within stator 110 on FIGS. 1-A through 1-E in sequence, where rotor 120 makes operational contact on stator 110 as rotor 120 moves around the inner periphery of stator 110. Returning to FIGS. 2-A trough 2-E, it will be appreciated that by selecting, setting and holding the rotor rotation axis of rotor 220 at a fixed offset distance from the rotation axis of stator 210, the same operational contact between rotor 220 and stator 210 can be replicated in test apparatus 200 as is experienced in conventional PDM power section 100 on FIGS. 1-A through 1-E. In test apparatus 200 on FIGS. 2-A through 2-E, however, there is no eccentric orbital rotation of rotor 220 within stator 210, thereby substantially eliminating vibration that might otherwise be caused by such eccentric orbital rotation.

Previous disclosure described how in most test environments, test apparatus 200 will be configured such that the offset between of rotor 220 and stator 210 is substantially the same as the eccentricity of the rotor's orbit in a full-size PDM whose performance the test coupon is designed to evaluate. For purposes of this paragraph, such offset between longitudinal rotational axes of rotor 210 and stator 220 will be referred to as the "ideal eccentricity". Additional embodiments of test apparatus 200 may be configured with variations in offset (greater or smaller) away from the ideal eccentricity. Such additional embodiments will simulate (and enable corresponding performance evaluation under) extreme loading conditions experienced by full-length PDM power sections in environments where the ambient dynamic loading conditions are deflecting rotor's eccentric orbit beyond design.

Physical embodiments of the disclosed test apparatus are now described with reference to FIGS. 3 through 9C. As before, where the same reference number or letter is used in FIGS. 3 through 9C, the same part or feature is being identified on more than one Figure.

Figure 3:
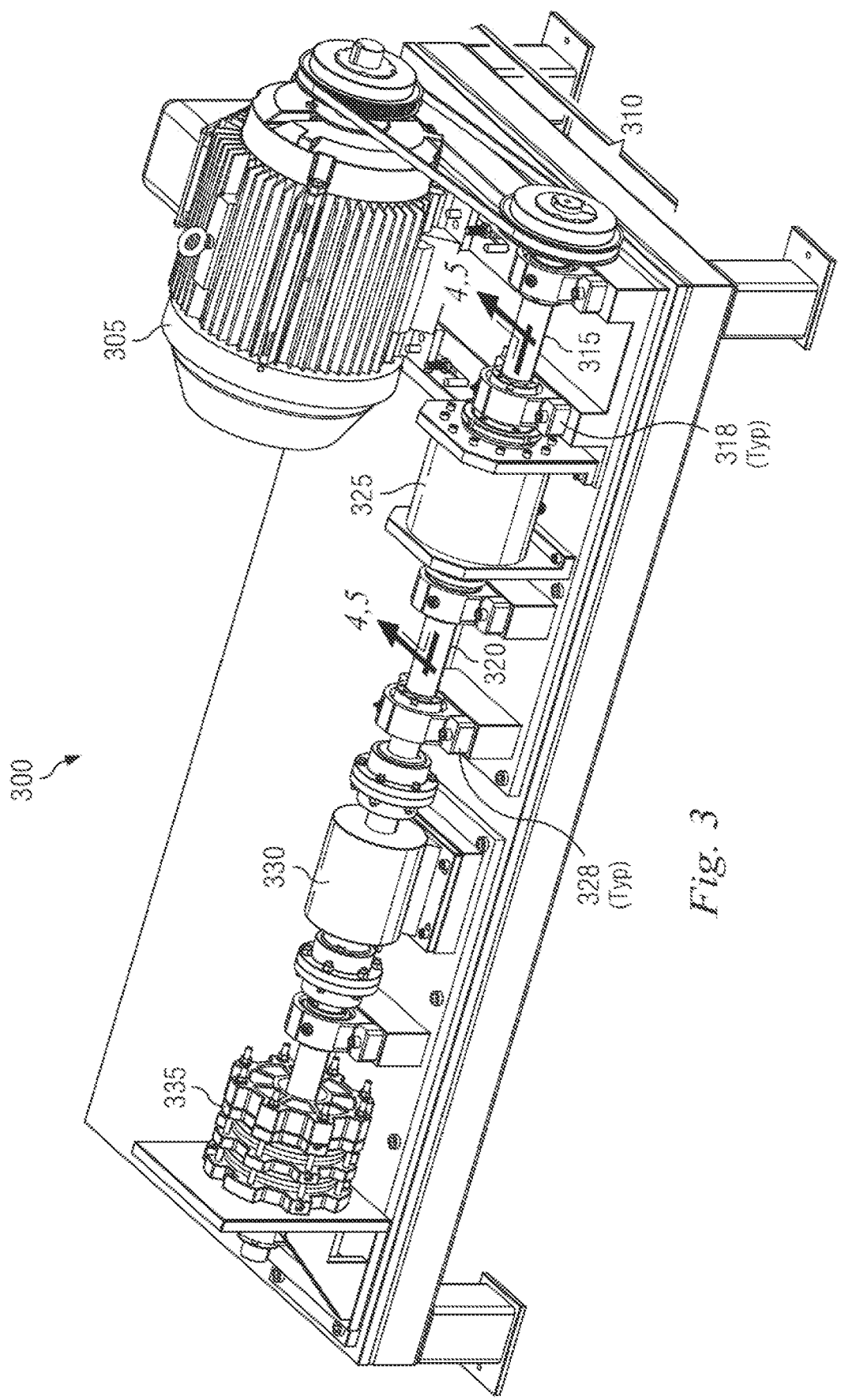
FIG. 3 shows an exemplary layout for test bed 300 on which components may be secured for enabling the disclosed new test apparatus 200.

FIG. 3 shows an exemplary layout for test bed 300 on which components may be secured for enabling the disclosed test apparatus. External motor 305 provides rotational power to rotor section 315 via drive train 310. External motor 305 is illustrated on FIG. 3 as an electric motor. The scope of the disclosed test apparatus is indifferent, however, to the type of external motor selected. Drive train 310 is illustrated in FIG. 3 as a belt-and-pulley drive train. Embodiments of test bed 300 that provide drive train 310 as a belt-and-pulley train will gain thither advantages as described below with reference to FIG. 6. However, this disclosure is not limited to embodiments whose drive train 300 is a belt-and pulley train.

Rotor section 315 on FIG. 3 is set rotationally in place on rotor bearings 318. It will be understood from momentary reference to FIG. 5 that a distal end of rotor section 315 terminates inside test chamber 325, and functions as the rotor portion of the test coupon under analysis in test chamber 325. Test chamber 325 is shown sealed on FIG. 3. Embodiments of the internals of test chamber 325 are discussed further below with reference to FIG. 4 and FIGS. 5 through 5C. Returning to FIG. 3, stator shaft 320 exits test chamber 325 and will be understood to be rotationally connected to stator section 321 inside test chamber 325 (again, refer momentarily to FIG. 4). Stator bearings 328 set stator shaft 320 rotationally in place. Stator shaft 320 is rotationally connected to torque sensor 330, which measures the torque generated by stator shaft 320 as stator shaft 320 rotates in response to external motor 305 driving rotor 315. Torque sensor 330 is further subject to intentional slowing of rotation via a braking torque supplied by continuous-slip brake 335, whereby control of the braking torque induces a controlled stress field (not illustrated) between rotor 315 and stator 321 inside test chamber 325. While the embodiments described with reference to FIG. 3 refer to a continuous-slip brake 335, it will be understood that the scope of the test apparatus is not limited in this regard, and that other types of conventional brakes may be substituted for continuous-slip brake 335.

Figure 4:
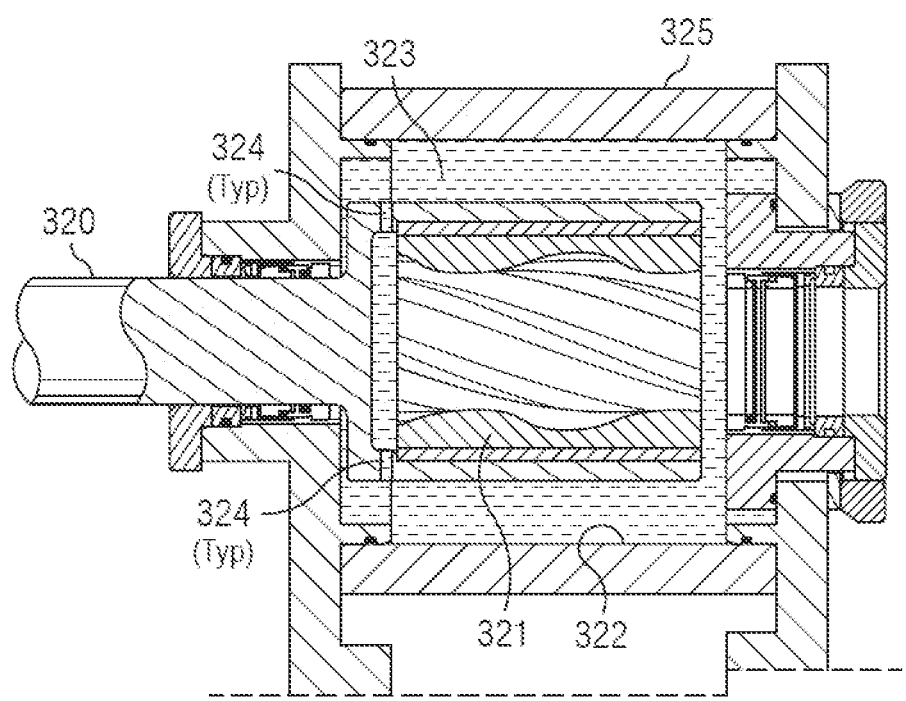
FIG. 4 illustrates test chamber 325 in cutaway view with internals and surrounding components.
Figure 5A:
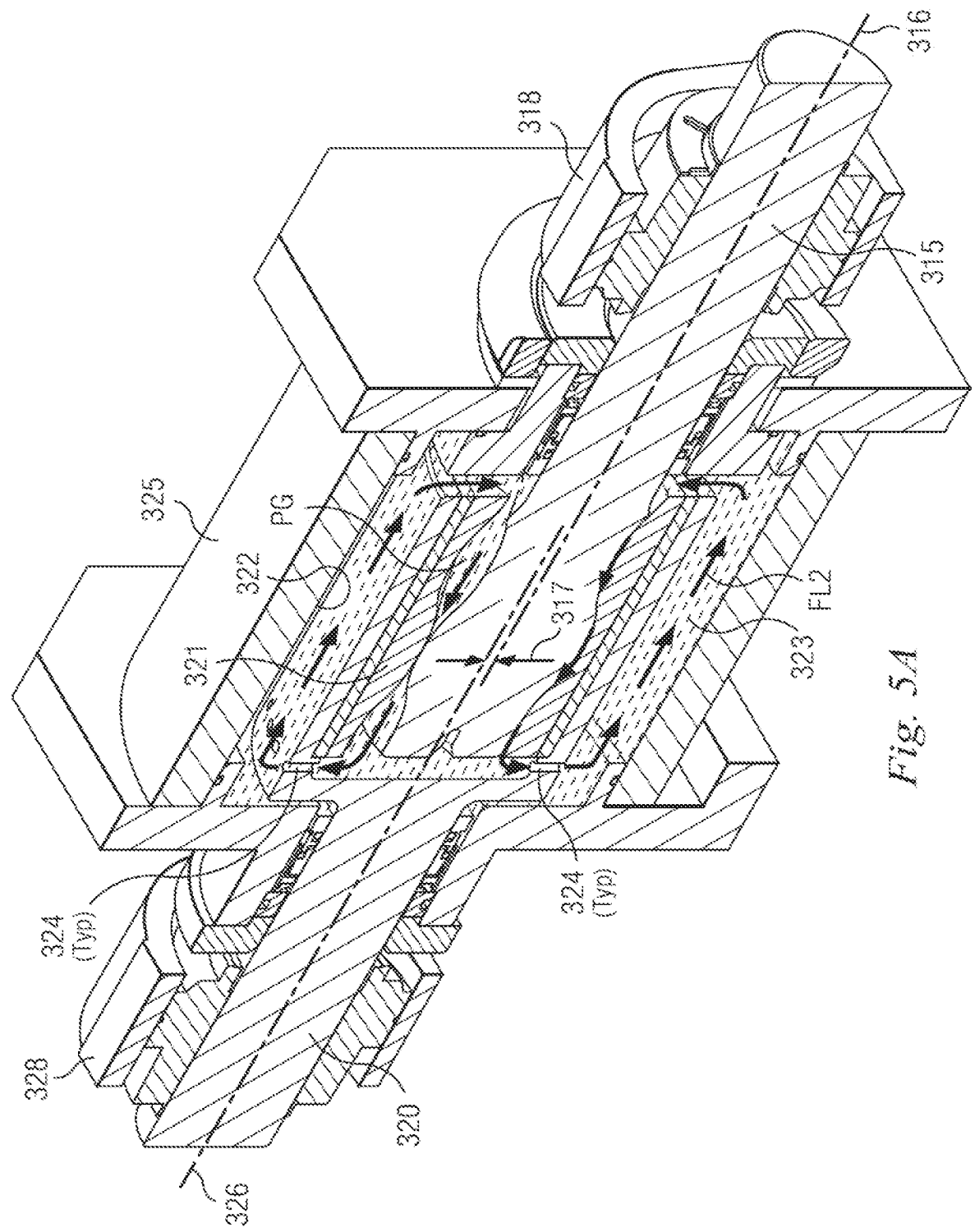
Figure 5B:
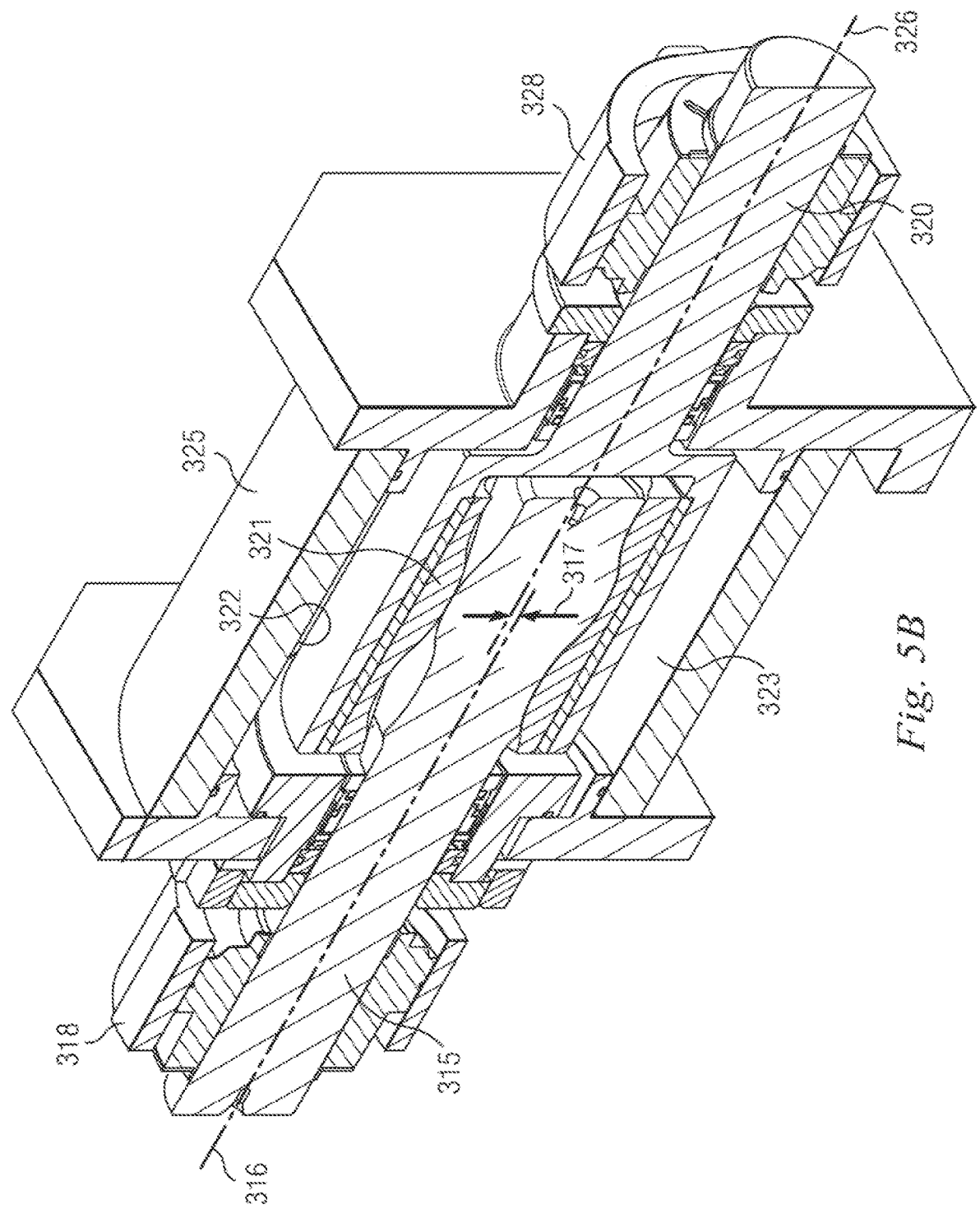
FIG. 5B illustrates a third embodiment of test chamber in 325 in cutaway view, in which stator section 321 is externally rotated to drive rotor section 315 within test chamber 325.
Figure 5C:
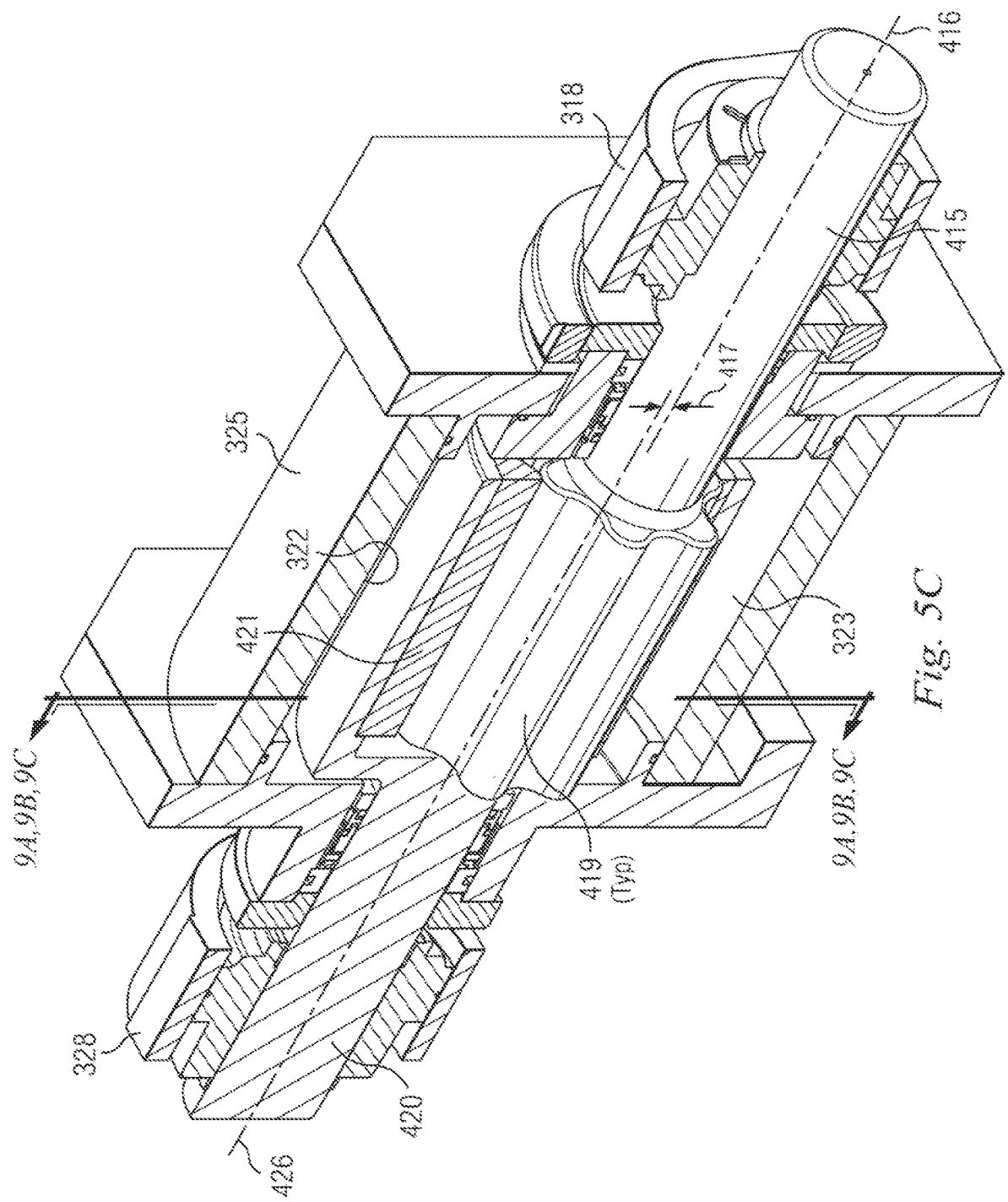
FIG. 5C illustrates a fourth embodiment of test chamber 325 in cutaway view, in which splined rotor section 415 is externally rotated to drive splined stator section 421 within test chamber 325.

Test chamber 325 will now be discussed in more detail with reference to FIG. 4 and FIGS. 5 through 5C. FIG. 4 and FIGS. 5 through 5C are section views shown generally on FIG. 3. Note FIG. 3 omits specific reference to FIGS. 5A through 5C mainly for clarity, it being understood from disclosure further below that FIGS. 5 through 5C are alternative embodiments and therefore the section line for FIG. 5 shown on FIG. 3 is representative for all of FIGS. 5 through 5C.

Referring first to FIG. 4, test chamber 325 is seen in cutaway view. Rotor section 315 is omitted for clarity. Stator section 321 is seen rotationally and coaxially fixed to stator shaft 320. Sealable test chamber 325 also provides annular cavity 322 formed between an external periphery of stator section 321 and an internal periphery of test chamber 325. Per the embodiment of FIG. 5A, described further below, FIG. 4 depicts openings 324 provided stator section 321. (It will be appreciated from disclosure further below that openings 324 are not provided in the embodiment of FIG. 5). In operation, test chamber 325 is filled with test fluid 323 (advantageously drilling fluid) prior to being sealed so that stator section 321 is completely immersed.

FIGS. 5 through 5C illustrate four exemplary alternative embodiments of test chamber 325 in more detail with surrounding components, again in cutaway view. Referring first to FIGS. 5 and 5A, first and second embodiments of test chamber 325 are illustrated in which progressing gaps PG are formed on helical pathways between stator section 321 and rotor section 315. Test chamber 325 is sealed and filled with test fluid 323. It was noted in earlier disclosure that test fluid 323 is present in test chamber 325 to interact with the materials from which rotor section 315 and stator section 321 are made, in order to simulate degradation that might be seen in actual downhole conditions. It was also noted in earlier disclosure, however, that once test chamber 325 was sealed, the relative differential rotation of rotor section 315 and stator section 321 may cause the test fluid 323 to flow under low pressure through progressing gaps PG. Referring to the embodiment of FIG. 5, and as illustrated by the darker arrows on FIG. 5, first flow loop FL1 for test fluid 323 is formed through progressing gaps PG. FIG. 5 depicts first flow loop FL1 in one exemplary flow direction, although it will be understood that flow loop FL1 may arise in either direction according to user selection of the direction in which to rotate rotor section 315.

Referring now to the embodiment of FIG. 5A, openings 324 are provided in stator section 321. The darker arrows on FIG. 5A illustrate that second flow loop FL2 for test fluid 323 may form in one exemplary flow direction, through progressing gaps PG in a direction away from the end near rotor bearing 318, then through openings 324 in stator section 321, then through annular cavity 322 back to the rotor bearing end of progressing gaps PG. Again, although not specifically illustrated on FIG. 5A, it will be understood that, according to user selection of the direction in which to rotate rotor section 315, second flow loop FL2 may flow in either direction. In general, first and second flow loops FL1 and FL2 on FIGS. 5 and 5A are indifferent to the direction in which test fluid 323 may be caused to flow.

FIGS. 5 and 5A further show rotor section 315 held rotationally in place by one of rotor bearings 318. Stator shaft 320 is also shown held rotationally in place by one of stator bearings 328. FIG. 5 further illustrates a cross-section cut for FIGS. 2-A through 2-J. It will be understood that freeze-frame views seen on FIGS. 2-A through 2-J represent movement of the disclosed test apparatus within test chamber 325 along an exemplary cross-section cut line as shown on FIG. 5.

FIGS. 5 and 5A also illustrate the preselected offset 317 between rotor rotation axis 316 and stator rotation axis 326. As discussed extensively above with reference to FIGS. 2-A through 2-E, for example, offset 317 is introduced to eliminate eccentric rotation vibration during operation of test chamber 325. It will be understood that relative adjustment of rotor bearings 318 and stator bearings 328 allows test chamber 325 to accommodate a range of offsets 317 to be selected, set and held according to user requirements.

FIG. 5B illustrates a third embodiment of test chamber 325. The embodiment of FIG. 5B is similar to the embodiment of FIG. 5 in many regards, except that rotor section 315 and section 321 have "switched positions" within test chamber 325 in the embodiment illustrated on FIG. 5B. That is, stator shaft 320 and stator section 321 on FIG. 5B are externally rotated within test chamber 315 (by, for example, external motor 305 as depicted on FIG. 3). Stator bearings 328 on FIG. 5B set stator shaft 320 rotationally in place. External rotation of stator shaft 320 on FIG. 5B causes test fluid 323 to flow through the progressing gaps on the helical pathways between stator section 321 and rotor section 315 within test chamber 325 (progressing gaps not labeled on FIG. 5B, refer to item PG on FIG. 5 instead for corresponding identification of this feature). Flow of test fluid 323 through the progressing gaps between stator section 321 and rotor section 315 within test chamber 325 on FIG. 5B causes rotor 315 to rotate. Rotor bearings 318 set rotor section 315 rotationally in place. It will be understood by comparative reference to FIG. 3 as described above that rotor section 315 is rotationally connected to torque sensor 330, which measures the torque generated by rotor section 315 as rotor section 315 rotates in response to external motor 305 driving stator shall 320 and stator section 321. Torque sensor 330 is further subject to intentional slowing of rotation via a braking torque supplied by continuous-slip brake 335, whereby control of the braking torque induces a controlled stress field (not illustrated) between rotor section 315 and stator section 321 inside test chamber 325. The stress field and other parameters/conditions regarding test chamber 325 (or rotor section 315 stator section 321 or test fluid 323 within test chamber 325) may then be measured and evaluated.

FIG. 5B also illustrates the preselected offset 317 between rotor rotation axis 316 and stator rotation axis 326. Preselected offset 317 will be understood to be available and operable on the embodiment of FIG. 5B even though rotor section 315 and stator section 321 have "switched positions" within test chamber 325 as compared to, say, FIG. 5. As discussed extensively above with reference to FIGS. 2-A through 2-E, for example offset 317 is introduced to eliminate eccentric rotation vibration during operation of test chamber 325. It will be understood that relative adjustment of rotor bearings 318 and stator bearings 328 allows test chamber 325 to accommodate a range of offsets 317 to be selected, set and held according to user requirements.

It will be also appreciated that the scope of this disclosure is not limited to the "switching of positions" of rotor and stator sections 315 and 321 as depicted in the embodiment of FIG. 5B as compared to the embodiment of FIG. 5, as described above. The scope of this disclosure includes the rotor and stator sections "switching positions" inside the test chamber for all test chamber embodiments, including the embodiments depicted on FIGS. 5A and 5C.

Figure 9A:
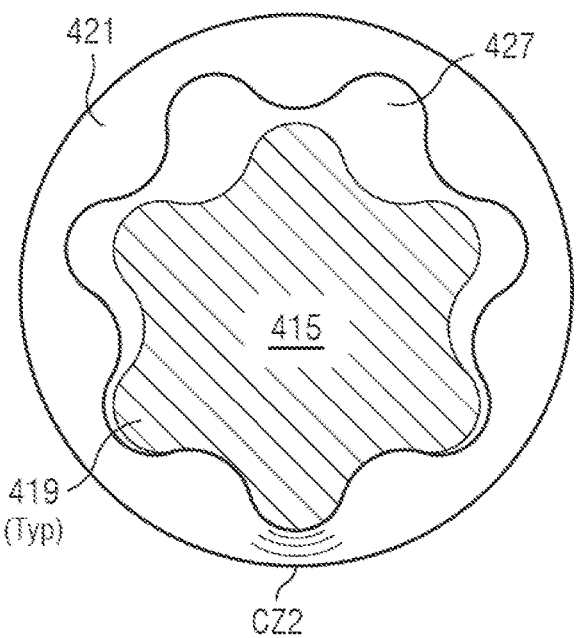
FIGS. 9A, 9B and 9C are sections as shown on FIG. 5C.
Figure 9B:
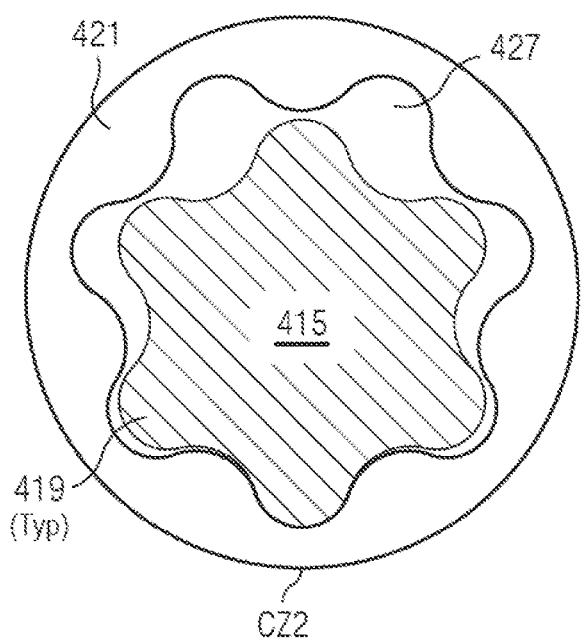
Figure 9C:
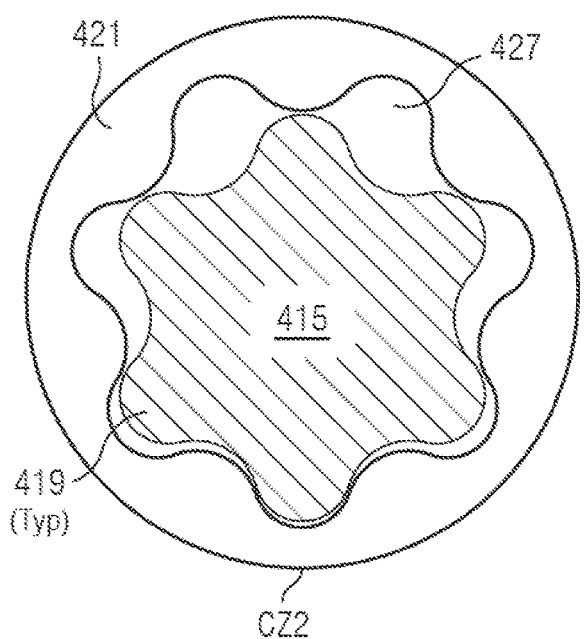

FIG. 5C illustrates a fourth embodiment of test chamber 325. FIGS. 9A, 9B and 9C are sections as shown on FIG. 5C. The embodiment of FIG. 5C depicts straight, longitudinal engagement between splined rotor section 415 and splined stator section 421 within test chamber 325. It will therefore be understood that the embodiment of FIG. 5C does not act like a conventional "Moineau" stator rotor assembly (such as described in the embodiments of FIGS. 5, 5A and 5B), since the embodiment of FIG. 5C does not provide helical pathways between splined rotor section 415 and splined stator section 421. Instead, with momentary reference to FIGS. 9A through 9C, splined rotor section 415 provides a plurality of straight, longitudinal splines 419 for engagement with straight, longitudinal splined stator cutouts 427 formed in splined stator section 421. It will be further understood that although FIG. 5C depicts straight, longitudinal splines 419 formed in splined rotor section 415, the scope if this disclosure is not limited in this regard, and that other embodiments (not illustrated) may deploy non-longitudinal straight splines on a rotor section disposed to be received in corresponding non-longitudinal, straight splined stator cutouts formed in the stator section.

As noted above in the "Summary" section, the artificially-created gearings between splined rotor section 415 and splined stator section 421 provided in splined embodiments such as depicted on FIG. 5C may be used to simulate desired conditions in test chamber 325 for evaluation of, for example, specific loading or environmental conditions of interest. A specific stress field between splined rotor section 415 and splined stator section 421, for example, or a specific downhole environment, again for example, may be artificially created, simulated and tested. As such, therefore, the scope of this disclosure is not limited to evaluating test coupons that are partial sections of a PDM, such as are illustrated and described above with reference to the embodiments of FIGS. 5, 5A and 5B.

FIG. 5C also illustrates preselected offset 417 between splined rotor rotation axis 416 and splined stator rotation axis 426. It will be understood that relative adjustment of rotor bearings 318 and stator bearings 328 allows test chamber 325 on FIG. 5C to accommodate a range of offsets 417 to be selected, set and held according to user requirements.

FIGS. 9A through 9C illustrate just one example of a specific loading condition and stress field that may be created, simulated, varied and evaluated using splined embodiments such as are depicted on FIG. 5C. FIGS. 9A through 9C are sections as shown on FIG. 5C, and should be viewed in conjunction with FIG. 5C. FIGS. 9A through 9C show three exemplary alternative sections through splined rotor section 415 and splined stator section 421. Each of FIGS. 9A through 9C are illustrated with different offsets 417 between splined rotor rotation axis 416 and splined stator rotation axis 426 (compare and refer with FIG. 5C). Each offset 417 will be understood to be selected via relative adjustment of rotor bearings 318 and stator bearings 328 on FIG. 5C. FIG. 9A reflects the most offset 417 between splined rotor rotation axis 416 and splined stator rotation axis 426 on FIG. 5C. FIG. 9C reflects the least offset 417 between splined rotor rotation axis 416 and splined stator rotation axis 426 on FIG. 5C. FIG. 9B reflects an offset 417 on FIG. 5C that is between offset 417 reflected on FIG. 9A and offset 417 reflected on FIG. 9C.

In each of FIGS. 9A through 9C, contact zone CZ2 at "6 o'clock", or 180 degrees azimuth between splined rotor section 415 and splined stator section 421 is one exemplary stress field variable being evaluated for load performance in the splined embodiment of FIG. 5C. It will be appreciated from FIGS. 9A through 9C that as splined rotor section 415 is rotated, torque transfer into splined stator section 421 is through rotor splines 419 engaged in splined stator cutouts 427 at contact zone CZ2 at 180 degrees azimuth. Splined stator section 421 rotates responsive to rotation of splined rotor section 415. Portions of splined stator section 421 thus move into and then out of contact zone CZ2 as splined stator section 421 rotates. In FIG. 9A, reflecting the most offset 417 between splined rotor rotation, axis 416 and splined stator rotation axis 426 on FIG. 5C, portions of splined stator section 421 are in compression as they move into and out of contact zone CZ2. Load performance of splined stator section 421 in this compressed condition may be evaluated in the presence of controlled test fluids or environmental conditions. In FIG. 9C, reflecting the least offset 417 between splined rotor rotation axis 416 and splined stator rotation axis 426 on FIG. 5C, there is a small gap (and thus no compression) between splined rotor section 415 and splined stator section 421 as portions of splined stator section 421 move into and out of contact zone CZ2. Torque transfer between splined rotor section 415 and splined stator section 421 is carried almost entirely through lobes on splined stator section 421 to the side of contact zone CZ2. Load performance of splined stator section 421 in this uncompressed/lobe-compressed condition may be evaluated in the presence of controlled test fluids or environmental conditions. In FIG. 9B, reflecting an offset 417 on FIG. 5C that is between offset 417 reflected on FIG. 9A and offset 417 reflected on FIG. 9C, portions of splined stator section 421 are merely in contact with splined rotor section 415 as they move and out of contact zone CZ2. Load performance of splined stator section 421 in this uncompressed but contacted condition may be evaluated in the presence of controlled test fluids or environmental conditions.

It will be understood from the above example with reference to FIGS. 9A through 9C that many performance variables may be isolated or combined, and then simulated and evaluated a splined embodiment such as illustrated in FIG. 5C. FIG. 5C and FIGS. 9A through 9C illustrate an embodiment where splined rotor section 415 provides six (6) rotor splines 419 engaged at contact zone CZ2 at 180 degrees azimuth in seven (7) splined stator cutouts 427 in splined stator section 421. Splined rotor section 415 in FIGS. 5C and 9A though 9C is further sized for a "near full fit" within splined stator section 421. It will be appreciated that the scope of this disclosure, however, is not hunted in any of the foregoing regards. Design choices within the scope of this disclosure include, for example and without limitation: number and size of rotor splines; number and size of splined stator cutouts; relative sizes and lengths of splined rotor section and splined stator section; azimuthal points of engagement between rotor splines and splined stator cutouts; amount of offset (and azimuth of offset) between splined rotor rotation axis and splined stator rotation axis; materials used for splined rotor section and splined stator section (including hybrid constructions); test fluid characteristics (such as chemistry or historical source); and environmental conditions such as temperature and internal pressure.

With further reference to FIG. 5C, and comparing with FIGS. 5 and 5A, it will also be appreciated that the splined embodiment of FIG. 5C does not create designated flow loops of test fluid 323 within test chamber 325, such as flow loops FL1 or FL2 described above with reference to FIGS. 5 and 5A. Instead, test fluid 323 in FIG. 5C is turbulent within test chamber 325, and the rotation of splined rotor section 415 as engaged on splined stator section 421 creates local eddies and flow patterns within test fluid 323. As such, test fluid 323 acts in part as a lubricant and coolant in splined embodiments such as in FIG. 5C. Test fluid 323 may also be selected in such embodiments for simulation evaluation of its specific chemical or mechanical effect on elastomer/rubber deployed on splined stator section 421.

FIG. 6 illustrates exemplary embodiments of drive train 310 as more generally illustrated on FIG. 3. On FIG. 6, three alternatives are illustrated in which varying drive speeds and torques may be delivered to rotor section 315 by external motor 305 via drive train 310. It will be understood, however, that the disclosed test apparatus is not limited to the three alternatives illustrated on FIG. 6, and that the scope of the disclosed test apparatus contemplates many alternative drive speeds and torques delivered to rotor section 315. It will be further appreciated that by providing different drive speeds and torques to rotor section 315, the disclosed test apparatus can simulate the mutation speed of a PDM power section, i.e. the "step down" effect of the "gear within the gear".

As suggested in earlier disclosure, external motor 305, drive train 310, rotor and stator bearings 318 and 328, torque sensor 330, continuous-slip brake 335, and other seals not called out by part number are all off-the-shelf components whose performance characteristics are selected to suit a particular design of the disclosed test apparatus. In presently preferred embodiments, a suitable external motor 305 is a Brook Crompton 75 HP AC 3-phase 230/460 V motor delivering up to 1800 rpm; a suitable continuous-slip brake 335 is a Wichita Clutch model KKB 208; suitable seals for test chamber 325 are UTEX models MP; suitable rotor/stator bearings 318/328 are available from Dodge; and a suitable torque transmitter 330 is a Himmelstein MRCT 39000X. The scope of the disclosed test apparatus is nonetheless not limited to any particular selection or combination of such off-the-shelf components. Likewise, the control of the disclosed test apparatus is advantageously via conventional PLC and PID control, and the scope of the disclosed test apparatus is not limited in this regard.

Figure 7B:
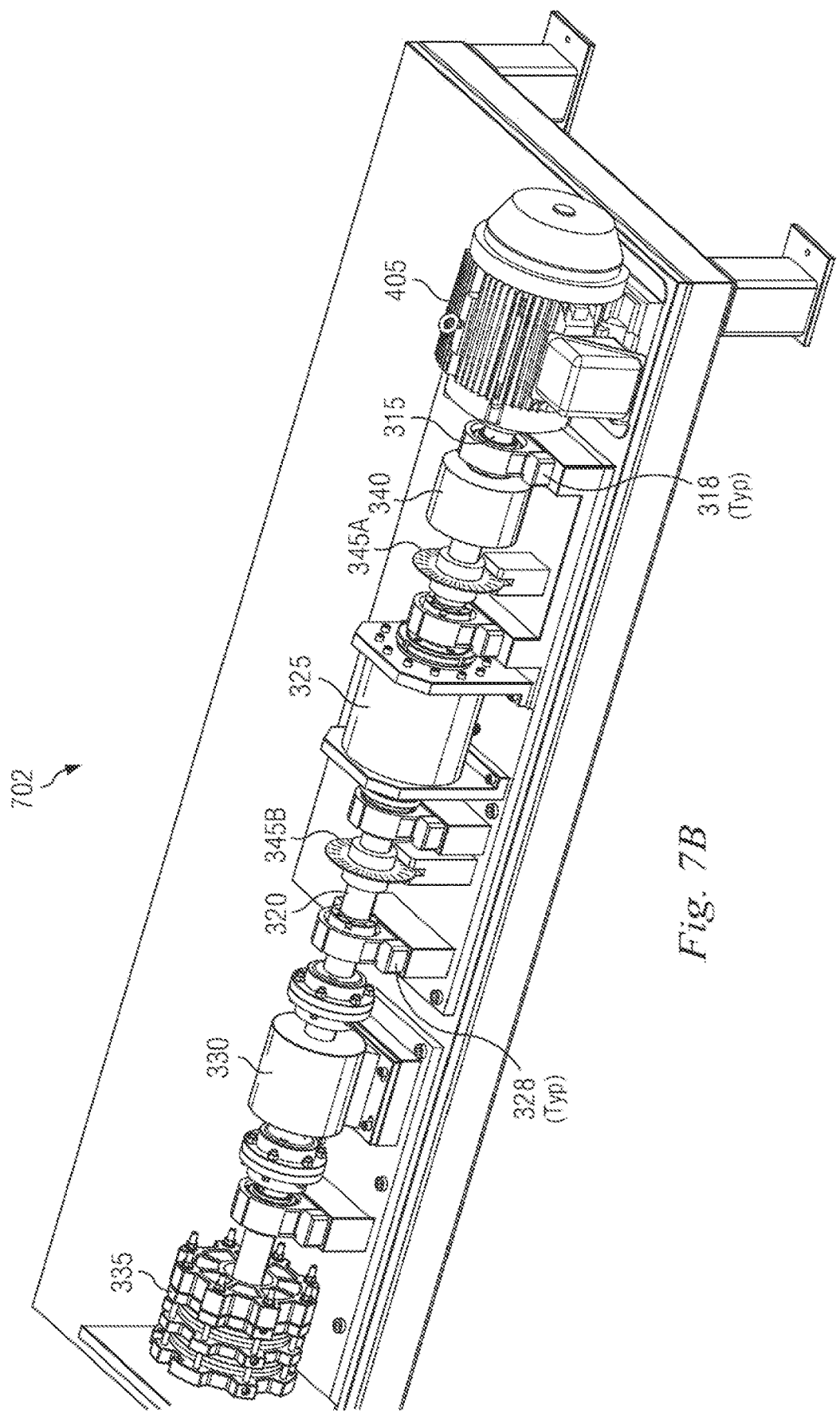

FIGS. 7A and 7B illustrate test bed embodiments 700 and 702, respectively, and should be viewed in conjunction and comparison with test bed embodiment 300 illustrated on FIG. 3. Generally, test bed 700 on FIG. 7A is functionally similar to test bed 300 on FIG. 3, except that additional and/or different equipment is deployed on test bed 700 to render test bed 700 capable of measuring and evaluating additional and/or different conditions within and around test chamber 325 on test bed 700. Specifically, test bed 700 on FIG. 7A provides the following equipment, external variable frequency drive motor (VFDM) 405; clutch 340 interposed between VFDM 405 and test chamber 325; and rotary encoders 345A/345B deployed either side of test chamber 325. FIG. 7A shows rotary encoder 345A positioned to measure/map rotation and angular position of rotor section 315, and rotary encoder 345B positioned to measure/map rotation and angular position of stator shaft 320 (attached to stator section 321, hidden from view within test chamber 325).

Test bed 702 on FIG. 7B is functionally similar to test bed 700 on FIG. 7A, except that test bed 702 on FIG. 7B is a direct drive embodiment, in contrast to test bed 700's belt drive embodiment shown on FIG. 7A. Test bed 702 on FIG. 7B also provides external variable frequency drive motor (VFDM) 405; clutch 340 interposed between VFDM 405 and test chamber 325; and rotary encoders 345A/345B deployed either side of test chamber 325 to measure/map rotation and angular position of rotor section 315 and stator shaft 320, respectively. It will be appreciated that much of the following description with refer rice to test bed 700 on FIG. 7A will be equally applicable to test bed 702 on FIG. 7B.

Test bed 700 on FIG. 7A provides rotary encoders 345A/345B to measure and evaluate operational rotary displacement between stator section 321 and rotor section 315 during operation. Rotary encoders 345A/345B each measure and compare incremental or absolute angular position of stator section 321 and rotor section 315 at moments in time. An example of suitable rotary encoder for use as rotary encoders 345A/345B on FIG. 7A is a Maxon Tacho 103935 encoder.

Figure 8:
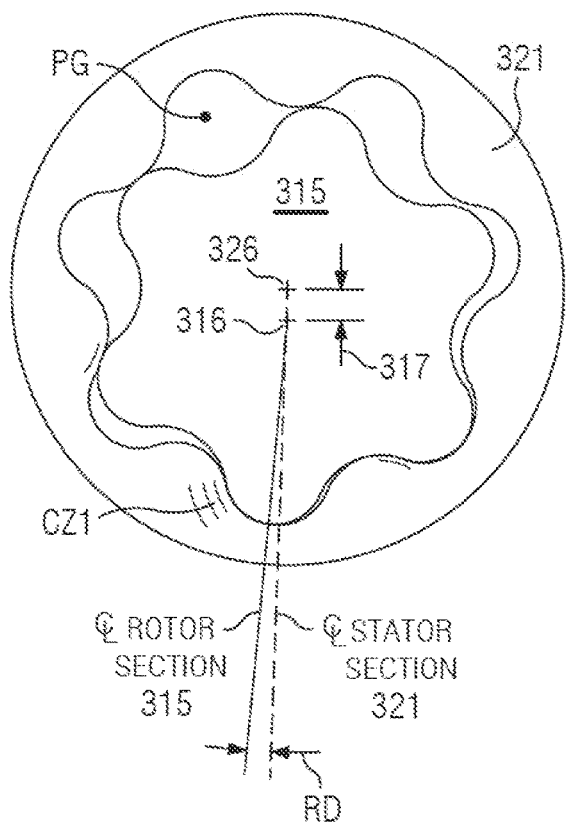
FIG. 8 illustrates expected rotary displacement RD between rotor section 315 and stator section 321 in test chamber 325 during operation of test bed embodiments such as shown on FIGS. 3, 5A, 5B, 7A and 7B, for example.

FIG. 8 illustrates expected rotary displacement RD between rotor section 315 and stator section 321 in test chamber 325 during operation of test bed embodiments such as shown on FIGS. 3, 5, 5A, 5B, 7A and 7B, for example. It will be understood on FIG. 8 that as rotor section 315 is externally rotated or as stator section 321 is externally rotated in the embodiment of FIG. 5B), compression of stator section 321 during torque transfer will be expected in areas such as contact zone CZ1. This compression of stator section 321 in contact zone CZ1 will in turn cause rotary displacement RD, at a given moment in time, between (A) the centerline running from rotor rotation axis 316 to bisect a lobe of interest on rotor section 315, and (B) the centerline running from stator rotation axis 326 to theoretically bisect (in an uncompressed state) the cutout in stator section 321 in which the lobe of interest on rotor section 315 is located. It will be further seen on FIG. 8 that rotary displacement RD subtends a compound angle because rotor and stator rotation axes 316 and 326 are separated in operation by preselected offset 317.

With momentary reference now to FIG. 7A, it will be understood that comparison of data from rotary encoders 345A/345B will enable rotary displacement RD on FIG. 8 to be measured and evaluated. Correction of comparison data may be required to account for the compound angle subtended by rotary displacement RD if preselected offset 317 between rotor and stator rotation axes 316 and 326 is sufficiently large to affect the accuracy or reliability of uncorrected comparison data.

In other embodiments (not illustrated) rotary displacement RD may arise as a result of torsional flex of rotor section 315 with respect to stator section 321. Rotary encoders 345A/345B may also be configured to measure and evaluate rotary displacement RD in the presence of such torsional flex of rotor section 315.

FIG. 8 is illustrated with respect to "Moineau"-design embodiments of stator section 321 and rotor section 315 having progressing gaps PG (and associated helical pathways). It will nonetheless be understood that although not specifically illustrated, deployments of rotary encoders 345A/345B such as on test bed embodiment 700 may also be used to measure and evaluate operational rotary displacement of splined rotor an stator sections 415 and 421 on the splined embodiments illustrated on FIG. 5C.

Test bed embodiment 700 on FIG. 7A further provides external variable frequency drive motor (VFDM) 405 to provide external rotation of rotor section 315. VFDM 405 is an alternative to conventional fixed-frequency external motor 305 shown on test bed 300 on FIG. 3. VFDM 405 is conventional, and suitable VFDMs are commercially available from GE, Delta or AC Tech Lenze, for example. It will be understood that variable frequency drive motors such as VFDM 405 on FIG. 7A conventionally have controllers to vary the voltage or alternating current frequency supplied to the motor, and thus vary the speed (and thus, indirectly, the torque) with which the motor rotates. The controllers may be governed by programmable software so that the motor may be customized to rotate in accordance with designed rotational speed patterns. Test bed embodiments providing VFDM 405 may thus provide external rotation of rotor section 315 (e.g. on FIG. 7A) in which the rotation is pulsed, for example. As a result, VFDM 405 may be programmed to simulate the rotation pulses (and thus, indirectly, the torque pulses) created when a PDM is used to drill inhomogeneous rock formations. Such a simulation is just one example of PDM drilling processes that may be simulated by varying the programming parameters in the VFDM software to provide different load pulsing. The scope of this disclosure is not limited to any particular rotation variations over time that may be generated by VFDM 405.

Although VFDM 405 has been described above with reference to test bed embodiment 700 on FIG. 7A, it will be understood that VFDM 405 may also be deployed in conjunction with other test bed embodiments, including those illustrated on FIGS. 3, 5, 5A, 5B, 5C and 7B, for example.

Disclosed test bed embodiments may also provide alternative embodiments of clutch 340. In some embodiments, clutch 340 is a conventional. Clutch acting simply to apply torque to rotor section 315 smoothly and gradually, and/or to limit rotation speed or torque delivered.

In some embodiments, clutch 340 is a slip clutch, such as, for example, a magnetic particle clutch or electromagnetic clutch, that may be used to control the rotation speed or torque applied to rotor section 315. In one non-limiting example, a magnetic particle clutch uses a powder of magnetically susceptible material to mechanically couple two rotatable components such as, for example, a motor and a rotor section. When a magnetic field is applied, the magnetically susceptible particles begin to lock in place. The applied magnetic field causes the powder to form chains connecting the two components. The strength of the chains is controlled by the strength of the magnetic field, and controls the amount of torque transferred from the rotating disc to the rotor. Torque is mechanically transmitted from one rotating component, through the chains of magnetically susceptible powder, to the second component. It will be appreciated that the control of a slip clutch may be used to control the torque delivered to the rotor section 315 from a fixed-frequency motor. Such embodiments allow for pulsed or cyclical torque to be applied to the rotor section while using a fixed-frequency or variable frequency motor.

In some embodiments, clutch 340 includes a variable transmission, such as, for example, a continuously variable transmission, that, like a slip clutch, may be used to control the rotation speed or torque applied to rotor section 315. In one non-limiting example, a continuously variable transmission uses a V-belt and two pulleys with conical sheaves to vary the drive ratio. The two conical sheaves of a pulley may be arranged such that moving the two sheaves closer together effectively increases the diameter of the pulley and moving the two sheaves farther apart effectively decreases the diameter of the pulley. The V-shaped cross section of the V-belt causes the belt to ride higher or lower on the pulley as the sheaves are moved closer or farther apart. It will be appreciated that the control of a variable transmission may be used to control the torque delivered to the rotor section 315 from a fixed-frequency motor. Such embodiments allow for pulsed or cyclical torque to be applied to the rotor section while using a fixed-frequency or variable frequency motor.

It will be understood that both slip clutches and variable transmissions may use programmable controllers to vary speed or torque transferred from a fixed-frequency motor or variable frequency motor to rotor section 315. The controllers may be governed by programmable software so that the torque applied to the rotor section 315 may be customized to control the rotation of the rotor section 315 in accordance with designed rotational speed patterns.

In another embodiment, clutch 340 may be an impact hammer-pin clutch. In this embodiment, torsional impact testing, may be simulated within test chamber 325. When engaged, clutch 340 allows drive pins within impact hammer-pin clutch to transfer torque to rotor section 315. The drive pins are received into corresponding sockets within impact hammer-pin clutch as torque is transferred through clutch 340. An impact is created each time a drive pin is received into a socket. Typically, a suitable impact hammer-pin clutch embodiment of clutch 340 will deliver one (1) to six (6) impacts per rotation, although the scope of this disclosure is not limited in this regard. Impact hammer-pin embodiments of clutch 340 are conventional, and are widely commercially available as also used in in impact wrenches, for example.

Clutch 340 transfers energy from the motor side of the clutch to the rotor section 315. In some embodiments, the energy supplied to the clutch 340 is from a fixed frequency motor 305 variable frequency drive motor 405. In some embodiments, such as, for example, FIG. 10, energy may be stored in a flywheel or heavy drive shaft on the motor side of the clutch. In some embodiments, a flywheel may be rotated by a secondary motor, thereby storing rotational momentum from the secondary motor in the flywheel. In some embodiments, the flywheel may be engaged, using clutch 340, to the rotor section in order to rapidly transfer the rotational energy built up and stored in the flywheel to the rotor section 315. In some embodiments the transfer of rotational energy from the flywheel to the rotor section accelerates the rotational speed of the rotor section.

Although embodiments of clutch 340 have been described above with reference to test bed embodiment 700 on FIG. 7A, it will be understood that embodiments of clutch 340, including alternative embodiments of clutch 340, may also be deployed in conjunction with other test bed embodiments, including those illustrated on FIGS. 3, 5, 5A, 5B, 5C and 7B, for example.

Figure 10:
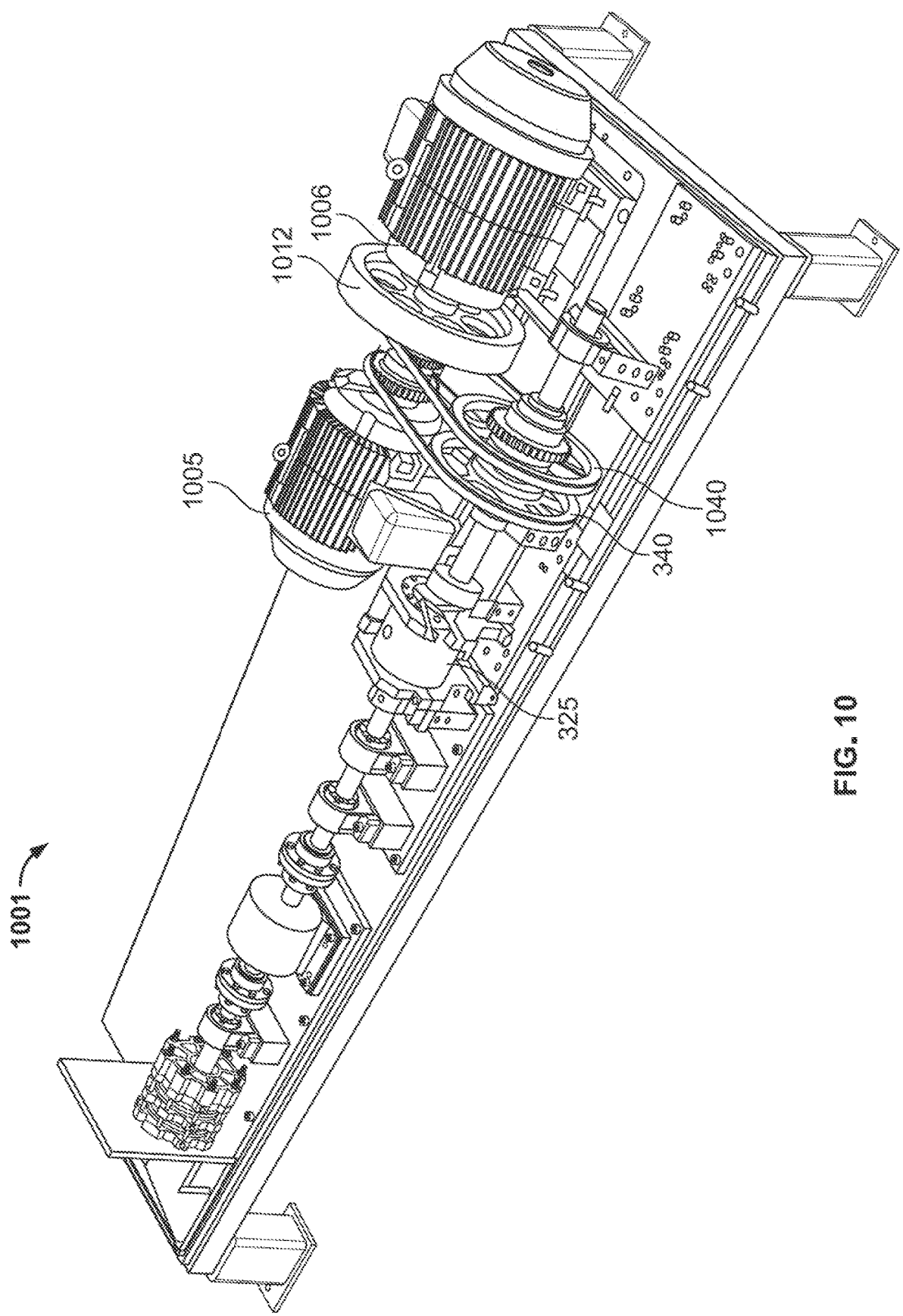
FIG. 10 illustrates alternative test bed embodiment 1001.

FIG. 10 illustrates test bed embodiments 1001 and should be viewed in conjunction and comparison with test bed embodiments 300 illustrated on FIG. 3, 700 illustrated on FIG. 7A, and 702 illustrated on FIG. 7B. Generally, test bed 1001 on FIG. 10 is similar to test bed 300 on FIG. 3, except that additional and/or different equipment deployed on test bed 1001 to render test bed 1001 capable of measuring and evaluating additional and/or different conditions within and around test chamber 325 on test bed 1001. Specifically, test bed 1001 on FIG. 10 provides the following equipment: primary external motor 1005; clutch 340 interposed between primary external motor 1005 and test chamber 325; secondary external motor 1006 used to rotate flywheel 1012 and a secondary clutch 1040 interposed between flywheel 1012 and test chamber 325. It will be appreciated that primary external motor 1005 and secondary external motor 1006 may each be either a fixed-frequency drive motor or variable frequency drive motor. It will be further appreciated that secondary clutch 1040, although identified independently, may include ally embodiment, including alternative embodiments, of clutch 340 described or suggested herein.

When drilling through certain formations or under certain drilling conditions, the rotational speed of various drill sting components, such as those within a rotor/stator power section may oscillate significantly. Test bed 1001, in addition to other embodiments, may be used to simulate such drilling conditions. Primary external motor 1005 and clutch 340 may be used to rotate rotor section 315 and thereby actuate stator shaft 320 as discussed herein. Continuous slip brake 335 may be applied to generate a base line of torque and induce a controlled stress field (not illustrated) between rotor 315 and stator 321 inside test chamber 325. Secondary external motor 1006 may be used to rotate flywheel 1012, thereby building up and storing rotational energy in flywheel 1012. Clutch 340 may be disengaged from rotor section 315. Secondary clutch 1040 may be engaged to rotor section 315, thereby rapidly transferring stored rotational energy from flywheel 1012 to rotor section 315 and increasing, the rotational speed of rotor section 315. Secondary clutch 1040 may be disengaged and the rotational speed of rotor section 315 may be allowed to slow. Clutch 340 may be reengaged to maintain a baseline rotational speed while rotational energy is build up and stored in the flywheel again. The above process may be used to induce cyclical periods of increased and decreased torque within test chamber 325. In some embodiments, the cyclical non-linear torque may have frequency in a range between about 0.01 Hz and about 10 Hz. In preferred embodiments, cyclical non-linear torque may have a frequency in a range between about 0.1 Hz and about 1 Hz. In more preferred embodiments, cyclical non-linear torque may have a frequency in a range between about 0.15 Hz and about 0.5 Hz. It will be appreciated that the increased rotational speed of the rotor section may be several times aster than the baseline speed. In some embodiments, the increased second rotational speed may be at least three times, at least five time, or at least seven times faster than the baseline first rotational speed. The use of flywheel 1012 and secondary clutch 1040 allows for rapid acceleration of rotor section 315 and the creation of torque pulses. The torque pulses delivered to rotor 315 may be substantially any size, shape, or frequency, including sinusoidal patterns, for example. The scope of this disclosure is not limited to any particular pattern of acceleration torque that may be applied to rotor section 315 or the manner which it is delivered.

A wide variety of load patterns may be simulated using the exemplary embodiment of test bed 1001. In addition to modulating the rotational speed of the rotor section, continuous-slip brake 335 may be applied, either continuously or dynamically, to modulate the torque or stress field between the rotor section 315 and stator section 321. The stress field and other parameters/conditions regarding test chamber 325 (or rotor section 315, stator section 321 or test fluid 323 within test chamber 325) may be measured and evaluated before, during, and/or after periods of induced non-linear load. In some embodiments, the periodic acceleration and deceleration of rotating rotor section 315 causes deformation, damage, and heating to the elastomer of stator section 321. The temperature of the test fluid and/or the elastomer interface may be may be measured and evaluated before, during, and/or after periods of induced non-linear load.

It will be appreciated that the load patterns simulated by test bed 1001 could be simulated by test bed 700 or 702 if variable frequency drive motor (VFDM) 405 is sufficiently powerful to deliver the desired rotational acceleration to rotor section 315. The use of secondary motor 1006 and flywheel 1012 allows for the generation of rapid acceleration using comparatively less powerful motors.

Referring to FIG. 7A, torque pulses may be simulated on test bed embodiment 700 (and indeed on other disclosed test bed embodiments) by pulsing the braking torque applied by continuous-slip brake 335. In embodiments where continuous-slip brake 335 is driven pneumatically, the air supply to brake 335 may be pulsed. Pulses on brake 335 may be any size, shape or frequency pattern, including sinusoidal or stepped (square wave) patterns, for example. The scope of this disclosure is not limited to any particular patterns of braking torque that may be delivered by brake 335, or the manner in which it is delivered.

Figure 11A:
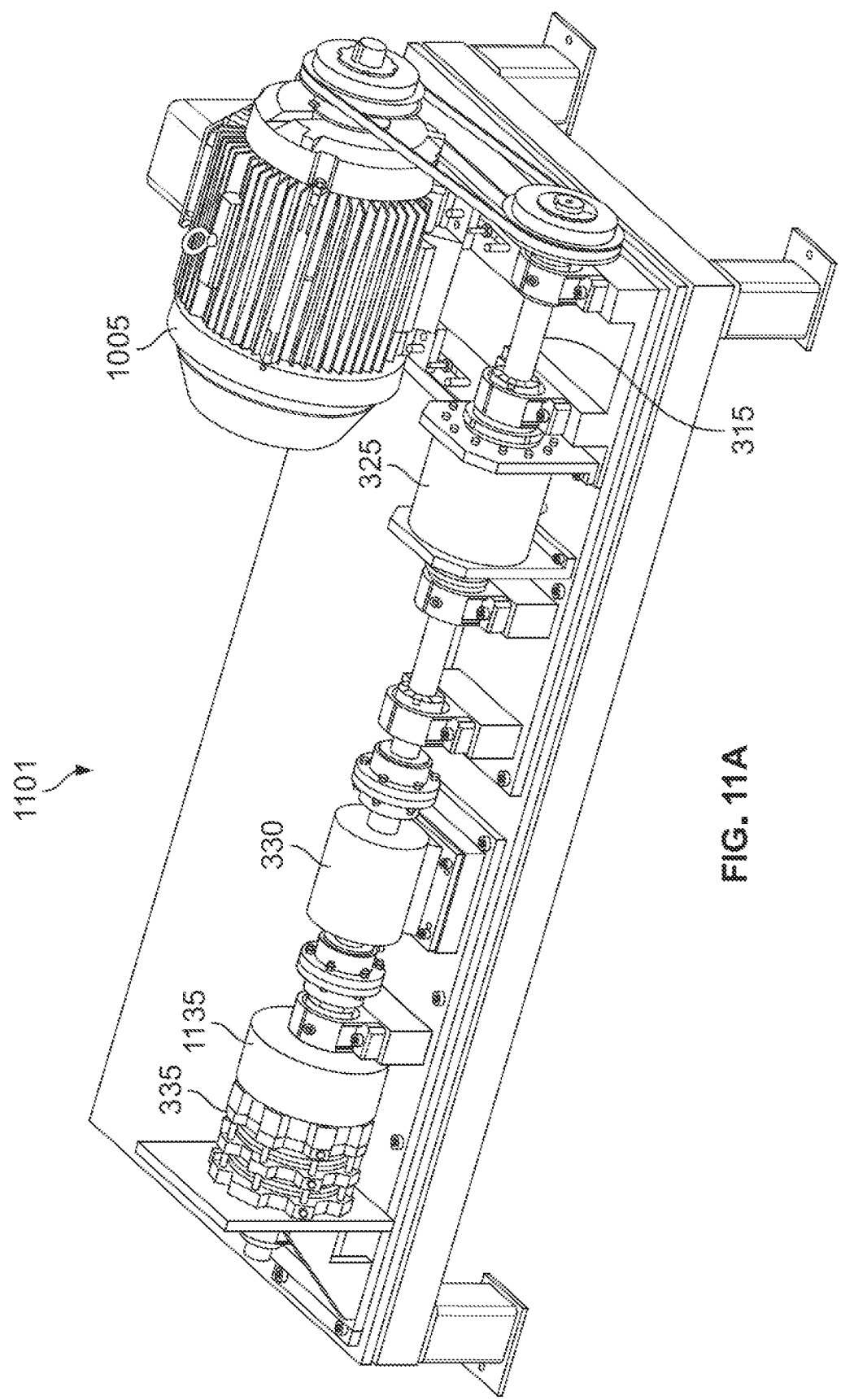
FIGS. 11A and 11B illustrate alternative test bed embodiments 1101 and 1103 respectively.

FIG. 11A illustrates test bed embodiments 1101 and should be viewed in conjunction and comparison with test bed embodiments 300 illustrated on FIG. 3, 700 illustrated on FIG. 7A, 702 illustrated on FIG. 7B, and 1001 illustrated on FIG. 10. Generally, test bed 1101 on FIG. 11A is similar to test bed 300 on FIG. 3, except that additional and/or different equipment is deployed on test bed 1101 to render test bed 1101 capable of measuring and evaluating additional and/or different conditions within and around test chamber 325 on test bed 1101. Specifically, test bed 1101 on FIG. 11 provides the following equipment: primary external motor 1005; clutch 340 interposed between primary external motor 1005 and test chamber 325; continuous slip brake 335 which may be actuated pneumatically; and dynamic brake 1135 which may be actuated hydraulically or electromagnetically. Torque pulses may be simulated on test bed embodiment 1101 (and indeed on other disclosed test bed embodiments) by pulsing the braking, torque applied by dynamic brake 1135. Pulses on brake 1135 may be any size, shape or frequency pattern, including sinusoidal or stepped (square wave) patterns, for example. The scope of this disclosure is not limited to any particular pattern of braking torque that may be delivered by brake 1135, or the manner in which it is delivered.

When drilling through certain formations, such as hard rock formations, or under certain drilling conditions, a rotor/stator power section may experience torsional resonance or torsional vibration. Test bed 1101, in addition to other embodiments, may be used to simulate these patterns. Primary external motor 1005 and clutch 340 may be used to rotate rotor section 315 at a substantially constant rotational speed and thereby actuate stator shaft 320 as discussed herein. Continuous slip brake 335 may be applied to generate a baseline level of torque and induce a controlled stress field (not illustrated) between rotor 315 and stator 321 inside test chamber 325. Dynamic brake 1135 may be dynamically applied by actuating the brake 1135 according to a desired pattern. As dynamic brake 1135 is actuated hydraulically or electromagnetically, brake 1135 may applied and released in rapid succession. In some embodiments, dynamic brake 1135 may be used to rapidly oscillate between the baseline level of torque load created by brake 335 and a significantly increased level of torque load created by dynamic brake 1135. In some embodiments, dynamic brake 1135 may be applied at a frequency in a range between about 1 Hz and about 10 Hz. In some embodiments, dynamic brake 1135 may be actuated using a solenoid operably connected to a processor or controller configured to actuate brake 1135 according to a desired pattern.

A wide variety of load patterns may be simulated using the exemplary embodiment of test bed 1101. The stress field and other parameters/conditions regarding test chamber 325 or rotor section 315, stator section 321 or test fluid 323 within test chamber 325) may be measured and evaluated before, during, and/or after periods of rapid oscillation between baseline and elevated levels of torque or simulated torsional resonance. In some embodiments, the rapid application of braking torque may causes deformation, damage, and heating to the elastomer stator section 321. Additionally, the temperature of the test fluid and/or the elastomer interface may be may be measured and evaluated before, during, and/or after periods of simulated torsional resonance.

It will be appreciated that the load patterns simulated by test bed 1101 could be simulated by test bed 300 if continuous-slip brake 335 is sufficiently controlled to deliver the desired braking load pattern. The use of dynamic brake 1135 allows for increased control and more rapid application of braking torque to more closely resemble downhole drilling conditions.

Figure 11B:
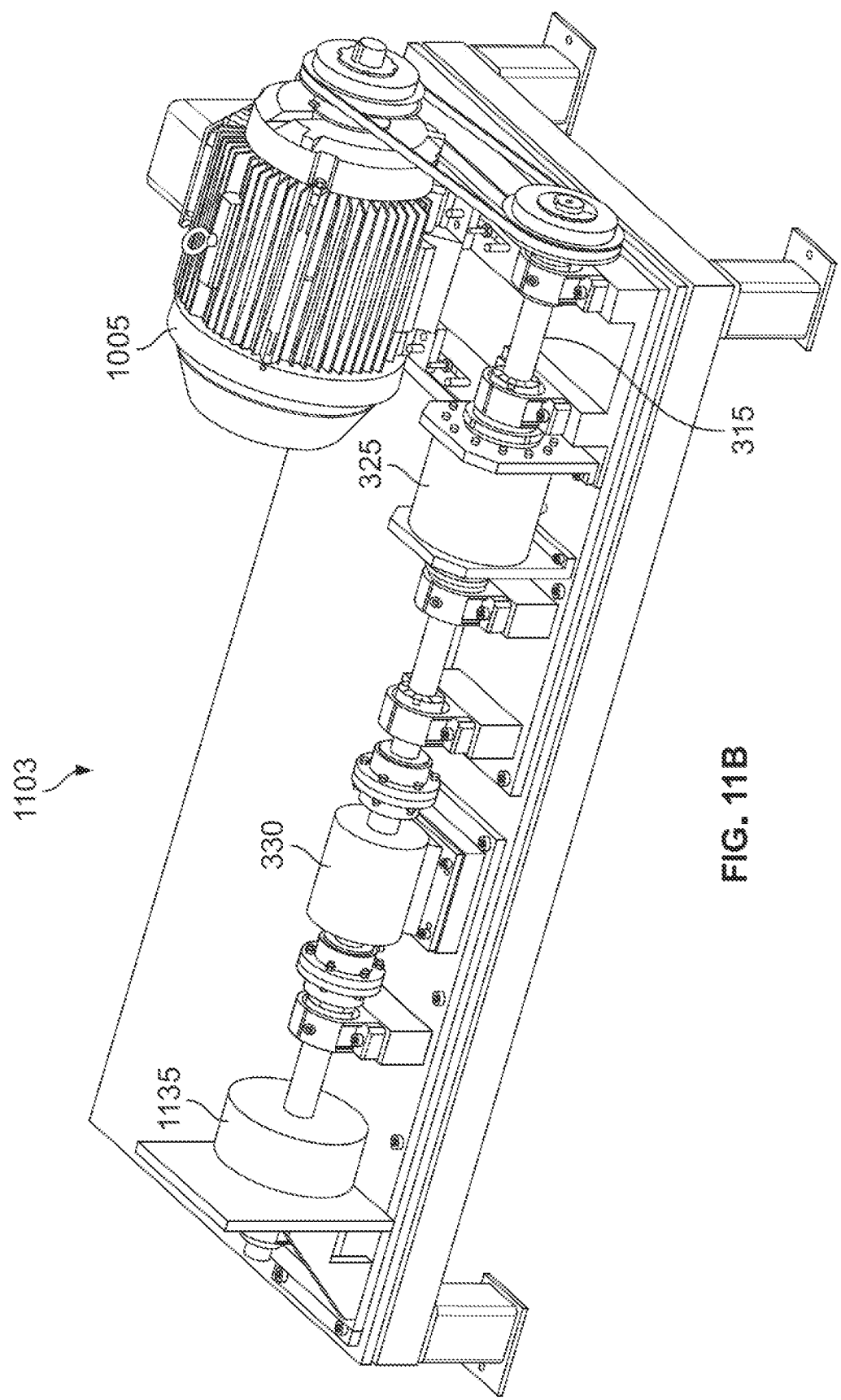

FIG. 11B illustrates an alternative test bed embodiments 1103 and should be viewed in conjunction and comparison with test bed embodiments 300 illustrated on FIG. 3 and test bed embodiment 1101 illustrated on FIG. 11A. Generally, test bed 1103 on FIG. 11B is similar to test bed 1101 on FIG. 11A, except test bed 1101 relies on dynamic brake 1135 to provide both the increased level of torque discussed in the context of FIG. 11A and the baseline level of torque provided by continuous slip brake 335 in test bed 1101. While pneumatic brakes and hydraulic brakes each possess their own advantages and disadvantages, test bed embodiment 1103 may be used to simulate torsional resonance forces using only dynamic brake 1135 if the braking force is applied with sufficient control to achieve the desired load pattern. In test bed embodiment 1101, the use of brake 335 to supply a consistent baseline of torque load allows dynamic brake 1135 to be applied significantly or not at all. In comparison, in test bed 1103, dynamic brake 1135 must be finely controlled to alternate between a desired upper level of braking, force and a desired lower level of braking force. Torque pulses may be simulated on test bed embodiment 1103 (and indeed on other disclosed test bed embodiments) by pulsing the braking torque applied by dynamic brake 1135 in a controlled manner. Pulses on brake 1135 may be any size, shape or frequency pattern, including sinusoidal or stepped (square wave) patterns, for example. The scope of this disclosure is not limited to any particular pattern of braking torque that may be delivered by brake 1135, or the manner in which it is delivered.

Figure 12:
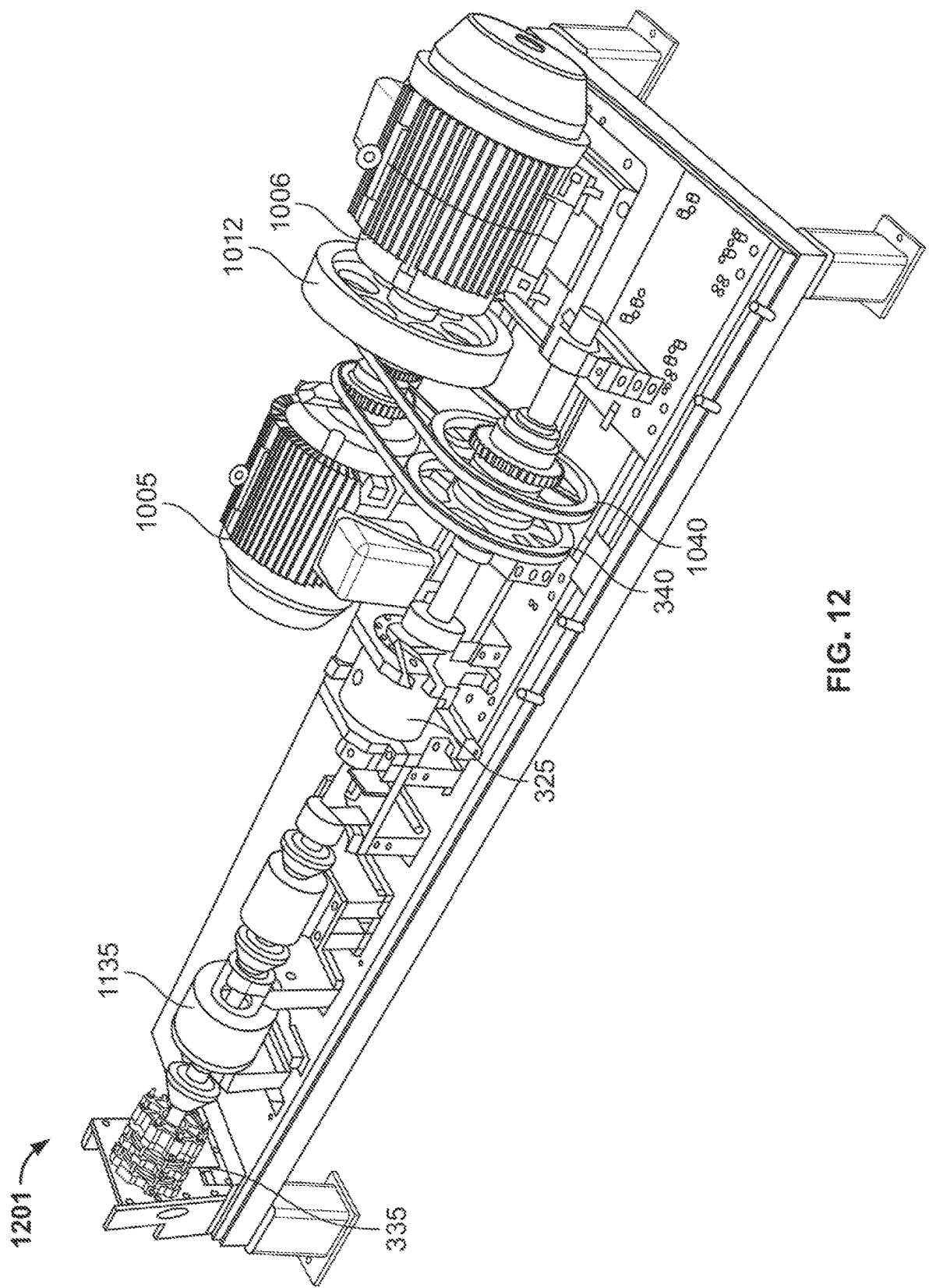
FIG. 12 illustrates alternative test bed embodiment 1201.

FIG. 12 illustrates test bed embodiments 1201 and should be viewed in conjunction and comparison with other disclosed test bed embodiments including, for example, test bed 300 illustrated on FIG. 3, 700 illustrated on. FIG. 7A, 1001 illustrated on FIGS. 10 and 1101 illustrated on FIG. 11A. Generally, test bed 1201 on FIG. 12 is similar to test bed 300 on FIG. 3, except that additional and/or different equipment is deployed on test bed 1201 to render test bed 1201 capable of measuring and evaluating additional and/or different conditions within and around test chamber 325 on test bed 1201. Specifically, test bed 1201 on FIG. 12 provides the following equipment: primary external motor 1005; clutch 340 interposed between primary external motor 1005 and test chamber 325; secondary external motor 1006 used to rotate flywheel 1012; secondary clutch 1040 interposed between flywheel 1012 and test chamber 325; continuous-slip brake 335; and dynamic brake 1135.

Test bed 1201 may be used to generate torque loads and pulses by modulating the rotational speed and acceleration of rotor section 315 and also by modulating the braking torque applied to actuated stator shall 320. The use of combined test bed 1201 allows for the simulation of or a wide variety of downhole drilling conditions using a single test bed. The torque loads created within test chamber 325 may be any size, shape or frequency pattern, including sinusoidal or stepped (square wave) patterns, for example. The scope of this disclosure is not limited to any particular pattern of torque load that may be delivered to test chamber 325 or the manner in which it is delivered.

Referring now to commonly-invented and commonly-assigned U.S. Provisional Patent Application Ser. No. 62/311,278 (the "Provisional Application"), to which this disclosure claims priority and whose provisional disclosure is incorporated herein by reference. FIG. 7 of the Provisional Application is an exemplary finite element analysis (FEA) image of static displacement (strain) based upon known torque stresses placed on a rotor to be used in conjunction with the disclosed test apparatus. The image is color coded to show increasing strain. FEA images of the type shown on FIG. 7 of the Provisional Application are useful, for example, for sizing the external motor driving the rotor and deriving specifications for the interconnecting drive train.

There now follows description of an exemplary operation of the disclosed test apparatus. It will be understood that the following disclosure is for illustration only, and that the disclosed test apparatus is not limited thereby.

The objectives of an exemplary test protocol may include to evaluate new elastomer compounds in an environment that accurately simulates expected downhole service in an operational PDM power section. With this in mind, a test stator section is prepared with the elastomer, molded into the actual stator profile to be expected downhole. The test stator section is placed into the test chamber. In accordance with the disclosed test apparatus, the stator section is then (1) exposed the actual drilling fluids expected downhole; (2) exposed to the actual elevated temperatures expected downhole; (3) loaded with comparative (or higher) forces and cycle frequencies expected downhole. The disclosed test apparatus may then, for example, measure the number of cycles to failure under defined loads and conditions. In some embodiments, the cycles to failure may be determined by counting, through to failure, the rotor section cycles and/or the stator section cycles. In other embodiments, the rotor section and/or stator section may be examined for wear. In other embodiments, temperature change over time inside the test chamber may be monitored. In other embodiments, temperature change over time may be monitored in an elastomer layer provided by the stator section at its contact surface with the rotor section. The test data yielded by the disclosed test apparatus will be expected to correlate closely to comparative test data that might have been extracted from a hypothetical power section in downhole service, and may be used to develop elastomer compounds with improved performance characteristics according to the service. Alternatively, without limitation, the disclosed test apparatus may be used to test the performance of actual test coupons and surrounding drilling fluids taken from PDMs in service in wells with their own chemistry.

Embodiments of the disclosed test apparatus may be expected to achieve the following exemplary target performance parameters (again, the following list is not exhaustive, and the scope of the disclosed test apparatus is not limited in any of the following regards):

Test chamber temperatures up to 350-400 degrees F.;

Ability to use stator sections or rotor sections cut from actual downhole tools; and Ability to load stator elastomers up to approximately 40% strain.

It will be appreciated that the scope of the disclosed test apparatus is not limited to the construction of stator sections that may be put in the test coupon, and includes, without limitation, all-elastomer construction, hybrid metal/elastomer constructions ("evenwall") or other types of construction. Likewise, the disclosed test apparatus is not limited to the size, type or construction of rotor that may be put in the test coupon.

Alternative embodiments of the disclosed test apparatus could further include, without limitation, the following features and aspects:
  (a) Substituting the disclosed offset shaft mounting of rotor and stator and convert the rotor to an eccentric transmission by which to receive rotational torque.
  (b) Adapting the disclosed test apparatus to evaluate miniaturized 1.0 to 2.0 stage motors, advantageously with small diameters.
  (c) Varying the number and locations of rotor/stator bearings for support of the rotor/stator.
  (d) Varying the number and locations of the test chamber fluid seals.
  (e) Deploying one or more accelerometers on or near the test chamber to monitor/map vibration (and changes in vibration patterns) within the test chamber over time during operation.

Although the inventive material in this disclosure has been described in detail along with some of its technical advantages, it will be understood that various changes, substitutions and alternations may be made to the detailed embodiments without departing from the broader spirit and scope of such inventive material as set forth in the following claims.

We claim:

1. In a test apparatus disposed to evaluate load performance data of a test coupon, wherein the test apparatus includes a motor, a brake, and at least one sensor configured to evaluate load performance data of the test coupon, wherein the test coupon includes a rotor section received inside a stator section, and wherein the stator section includes an original elastomer compound:
  a load performance dataset product of the process comprising the steps of:
  (a) actuating the motor to rotate the rotor section such that rotation of the rotor section actuates corresponding rotation of the stator section;
  (b) actuating the brake to apply braking torque to the stator section as it rotates in step (a); and
  (c) responsive to step (b), collecting data from the at least one sensor wherein the collected data includes data indicating load performance of the test coupon.

2. The load performance dataset product of claim 1, in which the load performance dataset product forms at least a partial basis for an adaptation of the original elastomer compound into an adapted elastomer compound.

3. The load performance dataset product of claim 1, in which the process further includes at least one of the following (i) or (ii):
  (i) during steps (a) and (b), controlling differential torque across the rotor section and the stator section; and
  (ii) during step (c), counting, through to failure of the test coupon, at least one of rotor section rotation cycles and stator section rotation cycles.

4. The load performance dataset product of claim 1, in which the test coupon comprises at least a partial length of a positive displacement motor (PDM) stage.

5. The load performance dataset product of claim 1, in which the test apparatus further includes a sealable test chamber at least partially filled with test fluid, and in which the test coupon is received and disposed to be sealed inside the test chamber.

6. The load performance dataset product of claim 5, in which the process further includes, during step (c), monitoring temperature change over time in the test chamber.

7. The load performance dataset product of claim 5, in which at least one progressing gap on a helical pathway forms between the rotor section and the stator section responsive to process step (a), and in which a first flow loop of test fluid is formed through the at least one progressing gap when the test chamber is sealed and the rotor section is rotated.

8. The load performance dataset product of claim 5, in which at least one progressing gap on a helical pathway forms between the rotor section and the stator section responsive to process step (a), and in which an annular cavity is formed between an external periphery of the stator section and an internal periphery of the test chamber, wherein the at least one progressing gap, a plurality of openings in the stator section, and the annular cavity form a second flow loop of test fluid when the test chamber is sealed and the rotor section is rotated.

9. The load performance dataset product of claim 1, in which the rotor section and the stator section are disposed to rotate about a longitudinal rotor axis and a longitudinal stator axis respectively, and in which the rotor axis and the stator axis are offset by a preselected axis offset distance.

10. The load performance dataset product of claim 9, in which the test coupon is selected to be representative of a full size PDM stage having a known rotor/stator eccentricity, and in which the preselected axis offset distance is selected to be substantially the same as the known rotor/stator eccentricity.

11. The load performance dataset product of claim 1, in which the test coupon is cut from a full size PDM stage through which drilling fluid was previously caused to flow.

12. The load performance dataset product of claim 5, in which the test fluid was previously passed through a full size PDM stage.

13. The load performance dataset product of claim 1, in which an exterior of the rotor section provides a plurality of rotor section splines and an interior of the stator section provides a plurality of splined stator section cutouts for receiving rotor section splines.

14. The load performance dataset product of claim 13, in which the rotor section and the stator section are disposed to rotate about a longitudinal rotor axis and a longitudinal stator axis respectively, and in which the rotor axis and the stator axis are offset by a preselected axis offset distance.

15. The load performance dataset product of claim 13, in which the rotor section and the stator section are disposed to rotate about a longitudinal rotor axis and a longitudinal stator axis respectively, and in which the rotor section splines are disposed parallel to the rotor axis and the splined stator section cutouts are disposed parallel to the stator axis.

16. The load performance dataset product of claim 1, in which the process further includes delivery of non-linear torque in at least one of actuating the motor in step (a) and actuating the brake in step (b).

17. The load performance dataset product of claim 16, in which the motor further comprises an impact hammer-pin clutch, and in which the non-linear torque is delivered at least in part by engaging the impact hammer-pin clutch when actuating the motor in process step (a).

18. The load performance dataset product of claim 16, in which the motor is a variable frequency drive motor, and in which the non-linear torque is delivered at least in part by varying motor rotation speed when actuating the motor in process step (a).

19. The load performance dataset product of claim 16, in which the non-linear torque is delivered at least in part by variably applying braking torque when actuating the brake in process step (b).

20. The load performance dataset product of claim 16, in which the motor further includes a slip clutch, and in which the non-linear torque is delivered at least in part by engaging the slip clutch when actuating the motor in process step (a).

21. The load performance dataset product of claim 16, in which the motor further includes a variable transmission, and in which the non-linear torque is delivered at least in part by engaging the variable transmission when actuating the motor in process step (a).

22. The load performance dataset product of claim 16, in which the test apparatus further includes a flywheel disposed to be rotated with torque provided independently from the motor, and in which the non-linear torque is delivered at least in part by:
   (i) rotating the flywheel with torque provided independently from the motor;
   (ii) disengaging the motor from the rotor section; and
   (iii) engaging the rotating flywheel onto the rotor section.

23. In a test apparatus disposed to evaluate load performance data of a test coupon, wherein the test apparatus includes a motor, a brake, and at least one sensor configured to evaluate load performance data of the test coupon, wherein the test coupon includes a rotor section received inside a stator section, and wherein the stator section includes an original elastomer compound:
   a load performance dataset product of the process comprising the steps of:
   (a) actuating the motor to rotate the stator section such that rotation of the stator section actuates corresponding rotation of the rotor section;
   (b) actuating the brake to apply braking torque to the rotor section as it rotates in step (a); and
   (c) responsive to step (b), collecting data from the at least one sensor wherein the collected data includes data indicating load performance of the test coupon.

24. The load performance dataset product of claim 23, in which the load performance dataset product forms at least a partial basis for an adaptation of the original elastomer compound into an adapted elastomer compound.

25. The load performance dataset product of claim 23, in which the process further includes at least one of the following (i) or (ii):
   (i) during steps (a) and (b), controlling differential torque across the rotor section and the stator section; and
   (ii) during step (c), counting, through to failure of the test coupon, at least one of rotor section rotation cycles and stator section rotation cycles.

26. The load performance dataset product of claim 23, in which the test coupon comprises at least a partial length of a positive displacement motor (PDM) stage.

27. The load performance dataset product of claim 23, in which the test apparatus further includes a sealable test chamber at least partially filled with test fluid, and in which the test coupon is received and disposed to be sealed inside the test chamber.

28. The load performance dataset product of claim 27, in which the process further includes, during step (c), monitoring temperature change over time in the test chamber.

29. The load performance dataset product of claim 27, in which at least one progressing gap on a helical pathway forms between the rotor section and the stator section responsive to process step (a), and in which a first flow loop of test fluid is formed through the at least one progressing gap when the test chamber is sealed and the rotor section is rotated.

30. The load performance dataset product of claim 27, in which at least one progressing gap on a helical pathway foil is between the rotor section and the stator section responsive to process step (a), and in which an annular cavity is fo med between an external periphery of the stator section and an internal periphery of the test chamber, wherein the at least one progressing gap, a plurality of openings in the stator section, and the annular cavity form a second flow loop of test fluid when the test chamber is sealed and the rotor section is rotated.

31. The load performance dataset product of claim 23, in which the rotor section and the stator section are disposed to rotate about a longitudinal rotor axis and a longitudinal stator axis respectively, and in which the rotor axis and the stator axis are offset by a preselected axis offset distance.

32. The load performance dataset product of claim 31, in which the test coupon is selected to be representative of a full size PDM stage having a known rotor/stator eccentricity, and in which the preselected axis offset distance is selected to be substantially the same as the known rotor/stator eccentricity.

33. The load performance dataset product of claim 23, in which the test coupon is cut from a full size PDM stage through which drilling fluid was previously caused to flow.

34. The load performance dataset product of claim 27, in which the test fluid was previously passed through a full size PDM stage.

35. The load performance dataset product of claim 23, in which an exterior of the rotor section provides a plurality of rotor section splines and an interior of the stator section provides a plurality of splined stator section cutouts for receiving rotor section splines.

36. The load performance dataset product of claim 35, in which the rotor section and the stator section are disposed to rotate about a longitudinal rotor axis and a longitudinal stator axis respectively, and in which the rotor axis and the stator axis are offset by a preselected axis offset distance.

37. The load performance dataset product of claim 35, in which the rotor section and the stator section are disposed to rotate about a longitudinal rotor axis and a longitudinal stator axis respectively, and in which the rotor section splines are disposed parallel to the rotor axis and the splined stator section cutouts are disposed parallel to the stator axis.

38. The load performance dataset product of claim 23, in which the process further includes delivery of non-linear torque in at least one of actuating the motor in step (a) and actuating the brake in step (b).

39. The load performance dataset product of claim 38, in which the motor further comprises an impact hammer-pin clutch, and in which the non-linear torque is delivered at least in part by engaging the impact hammer-pin clutch when actuating the motor in process step (a).

40. The load performance dataset product of claim 38, in which the motor is a variable frequency drive motor, and in which the non-linear torque is delivered at least in part by varying motor rotation speed when actuating the motor in process step (a).

41. The load performance dataset product of claim 38, in which the non-linear torque is delivered at least in part by variably applying braking torque when actuating the brake in process step (b).

42. The load performance dataset product of claim 38, in which the motor further includes a slip clutch, and in which the non-linear torque is delivered at least in part by engaging the slip clutch when actuating the motor in process step (a).

43. The load performance dataset product of claim 38, in which the motor further includes a variable transmission, and in which the non-linear torque is delivered at least in part by engaging the variable transmission when actuating the motor in process step (a).

44. The load performance dataset product of claim 38, in which the test apparatus further includes a flywheel disposed to be rotated with torque provided independently from the motor, and in which the non-linear torque is delivered at least in part by:
  (i) rotating the flywheel with torque provided independently from the motor;
  (ii) disengaging the motor from the rotor section; and
  (iii) engaging the rotating flywheel onto the rotor section.

45. In a test apparatus disposed to evaluate load performance data of a test coupon, wherein the test apparatus includes a motor, a brake disposed to be actuated via a hydraulic solenoid, a processor operably connected to the hydraulic solenoid, and at least one sensor configured to evaluate load performance data of the test coupon, wherein the test coupon includes a rotor section received inside a stator section, wherein the at least one sensor includes a torque sensor in data communication with the processor, wherein the torque sensor is configured to monitor torsional force exerted on a selected one of the rotor section and the stator section, and wherein the stator section includes an original elastomer compound:
  a load performance dataset product of the process comprising the steps of:
  (a) actuating the motor to rotate a first one of the rotor section and the stator section such that said rotation of the first one of the rotor section and the stator section actuates corresponding rotation of a second one of the rotor section and the stator section;
  (b) actuating the brake via the hydraulic solenoid to apply a dynamic braking force ultimately to the second one of the rotor section and the stator section as it rotates in step (a); and
  (c) responsive to step (b), collecting data from the at least one sensor including the torque sensor, wherein the collected data includes data indicating load performance of the test coupon.

46. The load performance dataset product of claim 45, in which the load performance dataset product forms at least a partial basis for an adaptation of the original elastomer compound into an adapted elastomer compound.

* * * * *

UNITED STATES PATENT AND TRADEMARK OFFICE
CERTIFICATE OF CORRECTION

| | |
|---|---|
| PATENT NO. | : 11,692,911 B2 |
| APPLICATION NO. | : 17/098035 |
| DATED | : July 4, 2023 |
| INVENTOR(S) | : Cariveau et al. |

It is certified that error appears in the above-identified patent and that said Letters Patent is hereby corrected as shown below:

In the Specification

In Column 2, Line 31, insert --minimum-- between --a-- and --of--.

In Column 3, Line 31, replace "pray" with --may--.

In Column 3, Lines 31-32, insert --low-- between --under-- and --pressure--.

In Column 3, Line 33, replace "May" with --may--.

In Column 3, Line 53, replace "high" with --highly--.

In Column 5, Line 27, replace "wider" with --under--.

In Column 5, Lines 35-36, insert --to-- between --chamber-- and --monitor/map--.

In Column 6, Line 17, replace "rot" with --rotation--.

In Column 7, Line 57, replace "tinge" with --time--.

In Column 10, Line 40, replace "testing," with --testing--.

In Column 10, Line 42, replace "shaft. Wherein" with --shaft wherein--.

In Column 10, Line 42, replace "shall" with --shaft--.

In Column 10, Line 46, replace "acid" with --and--.

In Column 10, Line 48, replace "shall" with --shaft--.

Signed and Sealed this
First Day of August, 2023

*Katherine Kelly Vidal*

Katherine Kelly Vidal
*Director of the United States Patent and Trademark Office*

CERTIFICATE OF CORRECTION (continued)
U.S. Pat. No. 11,692,911 B2

In Column 12, Line 45, replace "hammier" with --hammer--.

In Column 12, Line 56, replace "dating" with --during--.

In Column 14, Line 59, replace "Marker" with --marker--.

In Column 14, Line 64, replace "larker" with --marker--.

In Column 16, Line 16, replace "fill" with --full--.

In Column 18, Line 4, replace "sheer" with --shear--.

In Column 18, Line 25, replace "through. Show" with --through 2-E show--.

In Column 18, Line 38, replace "trough" with --through--.

In Column 19, Line 12, replace "thither" with --further--.

In Column 21, Line 8, replace "shall" with --shaft--.

In Column 23, Line 18, replace "hunted" with --limited--.

In Column 24, Line 40, replace "refer rice" with --reference--.

In Column 25, Line 27, replace "an" with --and--.

In Column 25, Line 62, replace "conventional. Clutch" with --conventional clutch--.

In Column 27, Line 34, replace "ally" with --any--.

In Column 28, Line 1, replace "aster" with --faster--.

In Column 28, Line 45, replace "patterns" with --pattern--.

In Column 30, Line 32, replace "shall" with --shaft--.

In the Claims

In Column 34, Lines 40-41 (Claim 30), replace "foil is" with --forms--.

In Column 34, Line 42 (Claim 30), replace "fo med" with --formed--.